(12) United States Patent
Hanks et al.

(10) Patent No.: US 9,708,544 B2
(45) Date of Patent: Jul. 18, 2017

(54) PRODUCTION OF OLEFINIC DIESEL AND CORRESPONDING OLIGOMERS

(71) Applicant: ExxonMobil Research and Engineering Company, Annandale, NJ (US)

(72) Inventors: Patrick Loring Hanks, Fairfax, VA (US); Bradley R. Fingland, Annandale, NJ (US); Suzzy Chen Hsi Ho, Princeton, NJ (US); Kun Wang, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 915 days.

(21) Appl. No.: 13/851,334

(22) Filed: Mar. 27, 2013

(65) Prior Publication Data

US 2013/0317263 A1    Nov. 28, 2013

Related U.S. Application Data

(60) Provisional application No. 61/617,970, filed on Mar. 30, 2012.

(51) Int. Cl.
*C10G 3/00*     (2006.01)
*C10G 50/00*    (2006.01)
(Continued)

(52) U.S. Cl.
CPC .................. *C10G 3/50* (2013.01); *C10G 3/44* (2013.01); *C10G 3/46* (2013.01); *C10G 3/49* (2013.01);
(Continued)

(58) Field of Classification Search
CPC ............... C10G 3/50; C10G 3/46; C10G 3/47
(Continued)

(56) References Cited

U.S. PATENT DOCUMENTS 5,246,566 A * 9/1993 Miller .................... B01J 29/064
                                                              208/111.25
5,616,531 A    4/1997 Feldhauser et al.
(Continued)

FOREIGN PATENT DOCUMENTS

EP      1396531 A2    3/2004
WO    2007068800 A2   6/2007
(Continued)

OTHER PUBLICATIONS

Hammond et al., Soybean Oil, 2005, Bailey's industrial oil and fat products, 6th edition, John Wiley and Sons, Inc.*
(Continued)

*Primary Examiner* — In Suk Bullock
*Assistant Examiner* — Youngsul Jeong
(74) *Attorney, Agent, or Firm* — Bruce M. Bordelon; Jamie L. Sullivan

(57) ABSTRACT

Feeds containing triglycerides are processed to produce an olefinic diesel fuel product. The olefinic diesel can optionally be oligomerized to form a lubricant base oil product. The olefinic diesel is generated by deoxygenating the triglyceride-containing feed using processing conditions that enhance preservation of olefins that are present in the triglycerides. The triglyceride-containing feed is processed in the presence of a catalyst containing a Group VI metal or a Group VIII metal and optionally a physical promoter metal.

13 Claims, 13 Drawing Sheets

(51) Int. Cl.
*C10G 65/04* (2006.01)
*C10G 69/12* (2006.01)
*C10L 1/02* (2006.01)
*C10L 1/08* (2006.01)

(52) U.S. Cl.
CPC .......... *C10G 50/00* (2013.01); *C10G 65/043* (2013.01); *C10G 69/126* (2013.01); *C10L 1/026* (2013.01); *C10L 1/08* (2013.01); *C10G 2300/1011* (2013.01); *C10G 2300/307* (2013.01); *Y02E 50/13* (2013.01); *Y02P 30/20* (2015.11)

(58) Field of Classification Search
USPC .................................................. 585/324, 639
See application file for complete search history.

(56) References Cited

U.S. PATENT DOCUMENTS

| | | | |
|---|---|---|---|
| 6,156,695 | A | 12/2000 | Soled et al. |
| 7,491,858 | B2 | 2/2009 | Murzin et al. |
| 7,795,484 | B2 * | 9/2010 | Koivusalmi ............... C07C 1/24 585/324 |
| 7,888,542 | B2 | 2/2011 | Koivusalmi et al. |
| 2008/0161614 | A1 | 7/2008 | Bertoncini et al. |
| 2009/0163744 | A1 | 6/2009 | Abhari et al. |
| 2009/0283442 | A1 * | 11/2009 | McCall .................... C10G 3/46 208/15 |
| 2009/0326285 | A1 | 12/2009 | Bauer et al. |
| 2010/0163458 | A1 | 7/2010 | Daudin et al. |
| 2010/0175308 | A1 | 7/2010 | Cole et al. |
| 2010/0176026 | A1 | 7/2010 | Cole et al. |
| 2010/0213103 | A1 | 8/2010 | Patron et al. |
| 2010/0270207 | A1 | 10/2010 | Gomes et al. |
| 2011/0005976 | A1 | 1/2011 | Rispoli et al. |
| 2011/0054230 | A1 | 3/2011 | Cole et al. |
| 2011/0056869 | A1 | 3/2011 | Novak et al. |
| 2011/0094149 | A1 | 4/2011 | Weiss et al. |
| 2011/0132803 | A1 | 6/2011 | Umansky et al. |
| 2011/0166396 | A1 | 7/2011 | Egeberg et al. |
| 2011/0294656 | A1 | 12/2011 | Soled et al. |
| 2011/0294657 | A1 | 12/2011 | Soled et al. |

FOREIGN PATENT DOCUMENTS

| | | |
|---|---|---|
| WO | 2010088486 A1 | 8/2010 |
| WO | 2011012439 A1 | 2/2011 |
| WO | 2011027044 A1 | 3/2011 |
| WO | 2011030009 A1 | 3/2011 |

OTHER PUBLICATIONS

PCT Search Report issued Aug. 22, 2013 in corresponding PCT Application No. PCT/US2013/034203 (5 pp.).
PCT Written Opinion issued Aug. 22, 2013 in corresponding PCT Application No. PCT/US2013/034203 (9 pp.).
"Alphaplus 1-Dodecene, Technical Data", Chevron Phillips Chemical Company LP, XP-002710055, (1 pg.).
Kubicka et al., "Deoxygenation of Vegetable Oils Over Sulfided Ni, Mo and NiMo Catalysts", Applied Catalysis A: General, Elsevier, vol. 372, No. 2, pp. 199-208 (2010).
Villarroel et al., "MD//Mo and MD//W [MD = Mn, Fe, Co, Ni, Cu and Zn] Promotion Via Spillover Hydrogen in Hydrodesulfurization", Applied Catalysis A: General, Elsevier, vol. 345, No. 2, pp. 152-157 (2008).
Murphy et al., "Compendium of Experiemental Cetane Number Data", National Renewable Energy Laboratory, XP-002710064, pp. 1-48 (2004).
Johnson, Marvin F.L., "Estimation of the Zeolite Content of a Catalyst from Nitrogen Adsorption Isotherms", Journal of Catalysts, 1978, pp. 425-431, vol. 52.
The International Search Report and Written Opinion of PCT/US2013/034206 dated May 28, 2013.
The International Search Report and Written Opinion of PCTUS2013/034209 dated May 28, 2013.

* cited by examiner

PRODUCTION OF OLEFINIC DIESEL AND CORRESPONDING OLIGOMERS

CROSS-REFERENCE TO RELATED APPLICATIONS

This application claims priority to U.S. Provisional Application Ser. No. 61/617,970 filed Mar. 30, 2012, herein incorporated by reference in its entirety.

FIELD

This invention relates to methods for processing to make diesel fuels, lubricant base stocks, and/or diesel or lubricant additives from renewable feed sources.

BACKGROUND

Regulations related to renewable fuels provide an example of how product requirements can change over time. The United States, Canada, and the European Union have recently increased and/or are likely to increase the required amount of product from renewable sources that is contained in transportation fuels. Based on such regulatory requirements, fuels from vegetable, animal, or algae sources such as "biodiesel" will become increasingly important as a refinery product. As a result, methods are needed that will allow existing refinery equipment to produce suitable transportation fuels that incorporate increasing amounts of renewable components.

Unfortunately, the differences in chemical composition between renewable carbon sources and mineral sources pose some difficulties for refinery processing. For example, typical biologically-derived sources for fuels have oxygen contents of 1 wt % or more, possibly as much as 10 wt % or more. Conventional hydroprocessing methods can remove oxygen from a feedstock, but the by-products from deoxygenation can lead to catalyst poisoning and/or contaminant build-up in a reaction system.

One potential feedstock source for making renewable diesel products is to use a feedstock that contains triglycerides. Triglycerides are present in many typical sources used as feedstock for making renewable products. Typical triglycerides useful for making renewable products include a three carbon glycerol backbone that has ester linkages to three longer side chains. Separating the side chains from the glycerol backbone typically results in formation of a fatty acid corresponding to each of the side chains. After separation from the glycerol backbone, the fatty acids can have a chain length that is suitable for use, possibly after further processing, in diesel products such as diesel fuels or diesel fuel additives.

U.S. Patent Application Publication 2010/0163458 describes a method for converting effluents of renewable origin into fuel. The method includes the use of a supported catalyst containing $MoS_2$ and a dopant, such as phosphorus, carbon, or silicon. The method is described as favoring removal of oxygen by hydrodeoxygenation as opposed decarbonylation or decarboxylation.

U.S. Patent Application Publication 2011/0166396 describes a hydrodeoxygenation catalyst and a method for using such a catalyst. The catalyst is a supported catalyst containing Mo, with a support that includes a bimodal pore distribution. Additionally, at least 2 volume percent of the pores in the support are greater than 50 nm in diameter. The Mo catalyst with the specified pore distribution is used to perform hydrodeoxygenation on feeds containing up to 35 vol. % of renewable organic material.

U.S. Pat. No. 7,795,484 describes a process for the manufacture of base oil. The process includes converting fatty acids into alpha olefins via first an ester and then an alcohol intermediate. The alpha olefins are then used to form oligomers in the form of branched hydrocarbons that are suitable for use as a base oil. The resulting oligomers are then saturated to eliminate remaining olefins.

U.S. Pat. No. 7,888,542 describes a process for producing a saturated hydrocarbon component. Potential feeds for the process include feeds containing at least 50% by weight of compounds that are unsaturated or polyunsaturated. Triglycerides are noted as a potential type of compound that can be unsaturated. The initial process step is described as an oligomerization step, where carbon-carbon double bonds from two unsaturated compounds are reacted to form a single molecule. When a triglyceride is used as the source of unsaturated molecules, the triglyceride is first converted to another form before oligomerization. This can correspond to performing transesterification of the triglyceride in methanol to form FAME compounds, or it can correspond to exposing the triglyceride feed to a clay containing an alkali or alkaline earth metal, such as montmorillonite, that converts triglycerides and forms oligomers in a single catalyst bed. The oligomerized feed is then exposed to an (optional) pre-hydrogenation step where the oligomerized feed is treated with hydrogen in the presence of a supported Group VIII or Group VI/Group VIII catalyst. The pre-hydrogenation conditions are described as being effective for saturating double bonds and reducing formation of coke in subsequent steps. The hydrogenated, oligomerized feed is then deoxygenated in the presence another supported Group VIII or Group VI/Group VIII catalyst. Pd supported on alumina is noted as a preferred catalyst for a deoxygenation process that does not use hydrogen, while a sulfurized NiMo catalyst is noted as preferred for a deoxygenation process in the presence of hydrogen. In an embodiment where the feed contains carboxylic acids or carboxylic acid esters, it is noted that the deoxygenation step can be performed prior to the oligomerization. After deoxygenation, the resulting product can optionally be isomerized.

SUMMARY OF PREFERRED EMBODIMENTS OF THE INVENTION

In one aspect, a method for processing a biocomponent feedstock is provided. The method includes exposing a feedstock comprising at least about 25 wt % triglycerides to a first catalyst in the presence of hydrogen under effective deoxygenation conditions for forming an at least partially deoxygenated effluent, the at least partially deoxygenated effluent having an oxygen content that is at least 40% less than an oxygen content of the feedstock, the catalyst comprising a supported Group VI metal catalyst or a supported Group VIII non-noble metal catalyst; separating the at least partially deoxygenated effluent to form a gas phase effluent and a liquid phase effluent, the liquid phase effluent comprising at least about 15 wt % olefins; and fractionating at least a portion of the liquid phase effluent to form a diesel product fraction, the diesel product fraction having an olefin to paraffin ratio of at least about 0.04.

Optionally, the method can further include exposing the liquid phase effluent to an acidic catalyst under effective conditions for oligomerization of at least a portion of the olefins to form a product effluent, wherein fractionating at least a portion of the liquid phase effluent to form a diesel product fraction comprises fractionating the product effluent to form at least a diesel product fraction and a lubricant base oil product fraction.

In another aspect, a method for processing a biocomponent feedstock is provided. The method includes exposing a feedstock comprising at least about 25 wt % triglycerides to a first catalyst in the presence of hydrogen under effective deoxygenation conditions for forming an at least partially deoxygenated effluent, the at least partially deoxygenated effluent having an oxygen content that is at least 40% less than an oxygen content of the feedstock, the catalyst comprising a supported Group VI metal catalyst or a supported Group VIII non-noble metal catalyst; separating the at least partially deoxygenated effluent to form a gas phase effluent and a liquid phase effluent, the liquid phase effluent comprising at least about 15 wt % olefins; exposing the liquid phase effluent to an acidic catalyst under effective conditions for oligomerization of at least a portion of the olefins to form a product effluent; and fractionating at least a portion of the liquid phase effluent to form a diesel product fraction and a lubricant base oil product fraction, the diesel product fraction having an olefin to paraffin ratio of at least about 0.04.

In still another aspect, a distillate product is provided, such as a diesel fuel product made in accordance with the above aspect. The distillate product can have a cetane rating of at least 40 and comprise at least about 50 wt % of molecules containing from 12 carbons to 18 carbons, an olefin to paraffin ratio of at least about 0.06, an oxygen content of about 1.0 wt % or less, a sulfur content of 50 wppm or less, and a T95 boiling point of 370° C. or less.

DETAILED DESCRIPTION OF THE PREFERRED EMBODIMENTS

Figure 1:
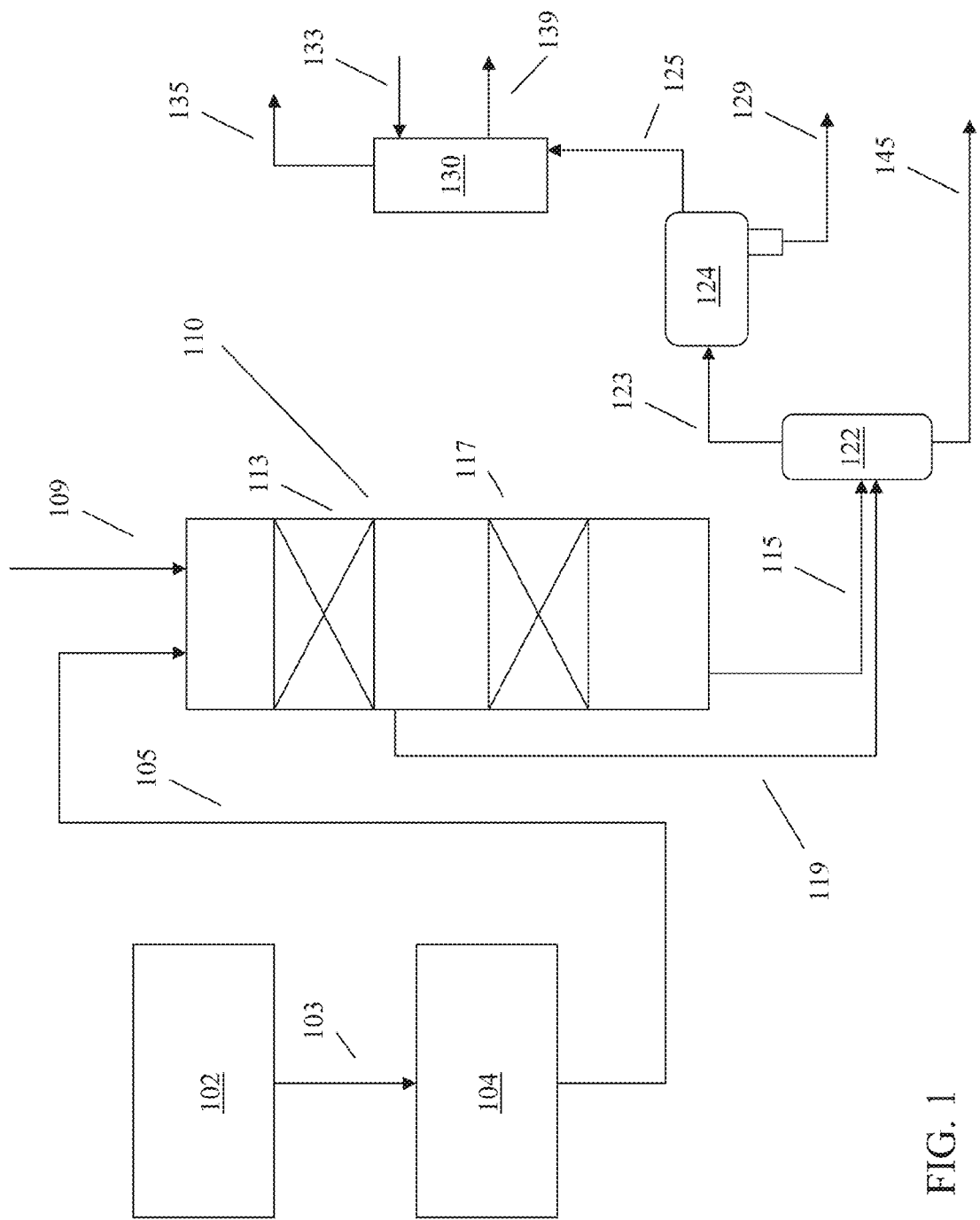
FIG. 1 schematically shows a reaction system suitable for performing a process according to an embodiment of the invention.

In various aspects, systems and methods are provided for processing a feed derived from biological sources to produce propylene as part of an integrated process for producing an olefinic diesel fuel product or additive. Optionally, a lubricant base oil product can also be generated. An example of a feed derived from a biological source is a triglyceride-containing feed. It has been discovered that by processing under effective conditions using a suitable catalyst, a feedstock containing triglycerides can be at least partially deoxygenated while preserving a substantial portion of the olefins present in the original feed. It has also been unexpectedly discovered that propylene is generated as an additional product during such processes for deoxygenation. This propylene is generated in place of propane, which is an expected product from separation of the side chains of a triglyceride from the backbone when using a deoxygenation catalyst.

The above discoveries allow for additional processing options in a refinery. Some processing options relate to the discovery of propylene being generated as a product during processing of a triglyceride-containing feed. After at least partial deoxygenation of a triglyceride-containing feed, gas phase products can be removed from the reaction system to allow for separation and recovery of propylene.

Other processing options relate to the discovery that olefins within a triglyceride-containing feed can be preserved during processing. One potential use for the resulting olefinic diesel product is for blending with other diesel fuels to provide diesel fuel with improved cold flow properties. Another option is to further process the olefinic diesel using processes that take advantage of the olefins that have been preserved. For example, the olefins preserved during at least partial deoxygenation of the triglyceride-containing feed can enable subsequent production of a lubricant base oil product or additive by oligomerizing a portion of the olefinic diesel product. In still other processing options, integrated processes can be used that take advantage of both the propylene product and the olefinic diesel product generated from the triglyceride-containing feed.

One option for deoxygenating a feed derived from a biological source under effective conditions while preserving olefins and/or generating propylene is to use a supported catalyst that includes a single Group VI or Group VIII metal sulfide. Examples of suitable metals include Mo, W, or Co. Optionally, the Group VI or Group VIII metal catalyst can further include a physical promoter metal, such as Zn or Mg. Supported Group VI or Group VIII metal catalysts are selective for performing deoxygenation while reducing or minimizing the amount of olefin saturation. This can allow for deoxygenation of a triglyceride-containing feed to remove oxygen while maintaining olefins that occur naturally within the biocomponent feed. This also reduces or mitigates saturation of any propylene generated during the deoxygenation. The methods described for deoxygenating a triglyceride-containing feed while preserving olefins also provide other processing advantages. For example, by reducing or mitigating the saturation of olefins, the hydrogen consumption for a deoxygenation process is reduced.

Feedstocks

In the discussion below, a feed derived from a biological source (i.e., a biocomponent feed or feedstock) refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis camerae, Prymnesium parvum, Tetraselmis chui,* and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella,* and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema,* and *Xenococcus* species.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure corresponding to a reaction product of glycerol and three fatty acids. Although a triglyceride is described herein as having side chains corresponding to fatty acids, it should be understood that the fatty acid component does not necessarily contain a carboxylic acid hydrogen. If triglycerides are present, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

In various embodiments, the production of propylene is based on processing of triglycerides within the biocomponent feed. Thus, the presence of at least some triglycerides within the biocomponent portion of a feed is desirable. The feed can include at least about 10 wt % of feed based on a biocomponent source or sources, or at least about 25 wt %, or at least about 50 wt %, or at least about 75 wt %, or at least about 90 wt %, or at least about 95 wt %. Additionally or alternately, the feed can be entirely a feed from a biocomponent source, or the feed can include about 99 wt % or less of a feed based on a biocomponent source, or about 90 wt % or less, or about 75 wt % or less, or about 50 wt % or less.

Higher amounts of feed from a biocomponent source provide an advantage based on the greater amount of renewable material, as well as potentially including a greater amount of triglycerides. Feeds with lower amounts of biocomponent materials may have other processing advantages. Such advantages can include improved flow characteristics within a reaction system, as biocomponent feeds often have a relatively high viscosity compared to conventional diesel or lubricant feeds in a refinery. Additionally, deoxygenation of a biocomponent feed generates a substantial amount of heat due to formation of highly favorable products from a free energy standpoint, such as $H_2O$ and $CO_2$. For a typical catalyst bed with a bed length of 25-30 feet (about 9-10 meters), it is preferable to have a temperature increase across the bed of 100° F. (55° C.) or less. If deoxygenation of a biocomponent feed with a high oxygen content is performed using a sufficiently reactive catalyst, an exotherm of greater than 100° F. across the catalyst bed can be generated. Blending a biocomponent feed with a portion that does not contain oxygen can reduce the exotherm generated across a catalyst bed used for performing deoxygenation.

The advantages of increased mineral feed content are largely due to dilution of the biocomponent feed, as the processing conditions effective for deoxygenation of a biocomponent feed will have a low or minimal impact on a typical hydroprocessed mineral feed. Therefore, while the deoxygenation conditions are effective for deoxygenation of biocomponent feeds at a variety of blend ratios with mineral feeds, it is preferable to have at least about 75 wt % of the feed from a biocomponent source, such as at least about 90 wt % or at least about 95 wt %.

One option for increasing the biocomponent content of a feed while retaining some of the benefits of adding a feed with reduced oxygen content is to use recycled product from processing of biocomponent feed as a diluent. A recycled product from processing a biocomponent feed is still derived from a biocomponent source, and therefore such a recycled product is counted as a feed portion from a biocomponent source. Thus, a feed containing 60% biocomponent feed that has not been processed and 40% of a recycled product from processing of the biocomponent feed would be considered as a feed that includes 100% of feed from a biocomponent source. As an example, at least a portion of the product from processing of a biocomponent feed can be a diesel boiling range product. Such a recycled diesel boiling range product will be deoxygenated, and therefore incorporation of the recycled diesel boiling range product in the feed will reduce the exotherm generated during deoxygenation. Adding a recycled diesel boiling range product is also likely to improve the cold flow properties of a biocomponent feed. More generally, any convenient product from processing of a biocomponent feed can be recycled for blending with the biocomponent feed in order to improve the cold flow properties and/or reduce the oxygen content of the input flow to a deoxygenation process. If a recycled product flow is added to the input to a deoxygenation process, the amount of recycled product can correspond to at least about 10 wt % of the feed to the deoxygenation process, such as at least about 25 wt %, or at least about 40 wt %. Additionally or alternately, the amount of recycled product in a feed can be about 70 wt % or less, such as about 50 wt % or less, 40 wt % or less, or about 25 wt % or less.

While feed dilution can be used to control the exotherm generated across a catalyst bed used for deoxygenation, it is noted that some processing options can also impact the exotherm. One alternative is to use a less reactive catalyst, so that a larger amount of catalyst is needed at a given liquid hourly space velocity (LHSV) in order to deoxygenate a feed to a desired level. Another option is to reduce the amount of hydrogen provided for the deoxygenation process. Still another option could be to introduce additional features into a reactor to assist in cooling and/or transporting heat away from a deoxygenation catalyst bed. In combination with selecting an appropriate amount of product recycle and/or blending of another non-oxygenated feed, a desired combination of a flow characteristics and heat generation during deoxygenation can be achieved.

With regard to triglyceride content, the feedstock can include at least about 1 wt % of triglycerides, such as at least about 10 wt %, or at least about 25 wt %, or at least about 50 wt %, or at least about 75 wt %, or at least about 90 wt %. Additionally or alternately, the feed can be composed entirely of triglycerides, or the triglyceride content of the feed can be about 95 wt % or less, such as about 90 wt % or less, or about 75 wt % or less, or about 50 wt % or less, or about 25 wt % or less. If propylene production is also desirable, feeds with higher triglyceride contents are preferred, such as feeds including at least about 25 wt % of triglycerides, or at least about 50 wt %, or at least about 75 wt %, or at least about 90 wt %.

The biocomponent portion of a feedstock can also be characterized relative to the olefin content of the feed. The olefin content of a biocomponent feed can vary widely depending on the source of the feed. For example, a feed based on soybean oil may contain up to 100% of molecules that contain at least one degree of unsaturation. Palm oils typically include 25-50 wt % of olefinic molecules, while coconut oil may include 15% or less of olefinic molecules. Depending on the embodiment, a biocomponent portion of a feed can include at least about 20 wt % olefins, such as at least about 40 wt % olefins, or at least about 50 wt % olefins, or at least about 75 wt % olefins. As defined herein, an olefin refers to any compound that includes an olefin bond. Thus, there are two ways that the wt % of olefins in a feed can be modified. If all olefins in a molecule are saturated, the molecule is no longer an olefin. Alternatively, if a molecule is broken down into smaller components, such as by deoxygenation or cracking, the wt % of olefins may be reduced if one or more of the smaller components does not contain an olefin. As an example, a triglyceride with an olefin bond in only one of the three side chains would be considered an olefin as defined herein. Therefore, the entire weight of the triglyceride would count toward the olefin weight percentage in the feed. After a deoxygenation that preserved olefin bonds, only the fatty acid resulting from the side chain including the olefin bond would count toward the olefin weight percentage. The other two fatty acids formed from the side chains would be separate molecules and therefore would not be considered olefins. Thus, even though no olefins were saturated, the weight percentage of olefins in the feed would still be lower.

In an embodiment, the biocomponent portion of the feedstock (such as the triglycerides) can be a non-hydrotreated portion. A non-hydrotreated feed can typically have an olefin content and an oxygen content similar to the content of the corresponding raw biocomponent material. Examples of suitable biocomponent feeds can include food grade vegetable oils, and biocomponent feeds that are refined, bleached, and/or deodorized.

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, for example up to about 12 wt % or up to about 14 wt %. Additionally or alternatively, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternatively, a biocomponent feedstream, prior to hydrotreatment, can include an olefin content of at least about 3 wt %, for example at least about 5 wt % or at least about 10 wt %.

A mineral feedstock refers to a conventional (e.g., non-biocomponent) feedstock, typically derived from crude oil and that has optionally been subjected to one or more separation and/or other refining processes. In one preferred embodiment, the mineral feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

Mineral feedstocks for blending with a biocomponent feedstock can be relatively free of nitrogen (such as a previously hydrotreated feedstock) or can have a nitrogen content from about 1 wppm to about 2000 wppm nitrogen, for example from about 50 wppm to about 1500 wppm or from about 75 to about 1000 wppm. In some embodiments, the mineral feedstock can have a sulfur content from about 1 wppm to about 10,000 wppm sulfur, for example from about 10 wppm to about 5,000 wppm or from about 100 wppm to about 2,500 wppm.

Preferably, a mineral feedstock for blending with a biocomponent feedstock can be a mineral feedstock with a relatively low sulfur content, such as a hydrotreated mineral feedstock. The single metal catalysts described below have relatively low activity for performing desulfurization and for hydrogenating or saturating olefins. This allows olefins to be (at least partially) preserved in the propylene product and diesel boiling range molecules generated after exposure to the single metal catalysts. In order to preserve these olefins, it may be desirable to avoid subsequent hydrotreatment of a biocomponent feedstock using a conventional hydrotreating catalyst with conventional hydrotreating conditions. Using a mineral feedstock for blending that contains a sufficiently low sulfur content can allow a resulting product to meet a desired sulfur specification without requiring a subsequent hydrotreatment under conditions that saturate olefins. As an alternative, if additional saturation of olefins in diesel boiling range molecules is desired, the olefins in propylene can be preserved by separating out propylene prior to any subsequent hydrotreatment. Such preferred feedstocks can be relatively free of sulfur, or can have a sulfur content from about 1 wppm to about 500 wppm, such as from about 10 wppm to about 200 wppm of sulfur or from about 20 wppm to about 100 wppm of sulfur. Additionally or alternatively, the combined (biocomponent plus mineral) feedstock can have a sulfur content of at least about 5 wppm, for example at least about 10 wppm, at least about 25 wppm, or at least about 100 wppm. Further additionally or alternatively, the combined feedstock can have a sulfur content of about 500 wppm or less, about 100 wppm or less, or about 50 wppm or less. Still further additionally or alternately, the nitrogen content of the combined feedstock can be about 1000 wppm or less, for example about 500 wppm or less, about 100 wppm or less, about 50 wppm or less, about 30 wppm or less, about 20 wppm or less, or about 10 wppm or less.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

The boiling range for biocomponent feedstreams suitable for use according to the invention can vary depending on the nature of the biocomponent source. Biocomponent feedstreams with final boiling points up to about 1000° F. (538° C.) may be suitable for use, as the triglycerides within a biocomponent feedstream will have a higher boiling point than the boiling point of the individual chains attached to the glycerol backbone. Mineral feedstreams suitable for use as a blending component tend to boil within the range of about 215° F. (about 102° C.) to about 800° F. (about 427° C.). Preferably, a mineral feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, a mineral feedstream has a final boiling point of about 800° F. (about 427° C.) or less, or about 750° F. (about 399° C.) or less. Additionally or alternately, a feedstock can be characterized by the boiling point required to boil a specified percentage of the feed. For example, the temperature required to boil at least 5 wt % of a feed is referred to as a "T5" boiling point. A suitable mineral (petroleum) feedstock can have a T5 boiling point of at least about 230° F. (about 110° C.), for example at least about 250° F. (about 121° C.) or at least about 275° F. (about 135° C.). Further additionally or alternately, the mineral (petroleum) feedstock can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Reactions for Oxygen Removal

Oxygen removal during hydroprocessing of a feedstock typically occurs via one of three reaction pathways. One potential reaction pathway is hydrodeoxygenation. In a hydrodeoxygenation reaction, oxygen is removed from feed molecule as water. The carbon chain for the feed molecule remains intact after a typical hydrodeoxygenation reaction. Water is a contaminant that can potentially contribute to deactivation of some conventional hydrotreating catalysts, such as NiMo or CoMo type catalysts. However, by itself water does not lead to corrosion within a reaction system. Additionally, removing oxygen as water maintains the chain length of a feed molecule. Maintaining the chain length of molecules intended for use as a fuel or fuel blending product is usually beneficial, as it means that a greater percentage of the carbon from the feed is incorporated into the final fuel product.

Hydrodecarboxylation removes oxygen by forming $CO_2$ from biofeeds. This $CO_2$ forms carbonic acid when combined with water. Carbonic acid corrosion may require metallurgical upgrades to carbon steel in downstream equipment, particularly fin fans, heat exchangers, and other locations that liquid water will be present prior to a an amine scrubbing system or other system for removing $CO_2$.

Hydrodecarbonylation removes oxygen by forming CO from biofeeds. CO is a known inhibitor for hydrodesulfurization. For example, 1000 ppm CO can deactivate a conventional CoMo catalyst by 10%. CO is also not removed in appreciable quantities by conventional amine scrubbing systems. As such, CO can build up through gas recycle and can be cascaded to downstream hydrotreatment, dewaxing, and/or hydrofinishing stages. As a result, removing oxygen from a biocomponent feed as CO may require the use of pressure swing adsorbers (including rapid cycle pressure swing adsorbers) or other gas cleaning equipment in order to remove CO from a reaction system.

Depending on the conditions present in a reactor, the relative amounts of CO and $CO_2$ in a reactor can be modified by the water gas shift reaction. The water gas shift reaction is an equilibrium reaction that can convert $CO_2$ and $H_2$ into CO and $H_2O$. Due to the water gas shift reaction, the amount of decarbonylation and decarboxylation may not be clear, due to conversion from one form of carbon oxide to another. Hydrodeoxygenation can be distinguished at least in part from decarbonylation and decarboxylation by characterizing the odd versus even numbered carbons in a deoxygenated product.

Most catalysts used for performing a catalytic deoxygenation of a biocomponent feed will be less than 100% selective for a given pathway. Instead, at least some deoxygenation of a feed will occur via each of the three pathways mentioned above during a typical catalytic deoxygenation of a feed. The relative amounts of deoxygenation by each method will vary depending on the nature of the catalyst and the reaction conditions.

Because feeds derived from biological sources typically have carbon chains with even numbers of carbon molecules, hydrodeoxygenation can be distinguished from decarbonylation and decarboxylation based on the carbon chain length of the resulting molecules. Hydrodeoxygenation typically leads to production of molecules with an even number of carbon atoms while decarbonylation and decarboxylation lead to molecules with an odd number of carbon atoms.

Hydroprocessing Conditions—Deoxygenation

A catalyst suitable for oxygen removal during processing of a biocomponent portion of a feedstock can be a supported metal sulfide catalyst. The metal can be one or more Group VI metals (corresponding to Group 6 of the modern IUPAC periodic table) such as Mo or W, or one or more Group VIII non-noble metals (corresponding to Groups 8-10 of the modern IUPAC periodic table) such as Co. The support for the catalyst can be any convenient type of support, such as alumina, silica, zirconia, titania, amorphous carbon, or combinations thereof. In this document, a supported Group VI metal catalyst is defined as a catalyst that includes one or more Group VI metals on a support. A supported Group VI metal catalyst is further defined to exclude the presence of Group VIII metals as part of the catalyst. During catalyst synthesis, the one or more Group VI metals will typically be deposited or otherwise impregnated on the support as oxides. The oxides are typically converted to sulfides prior to use in a deoxygenation process. Thus, the definition herein of a Group VI metal catalyst includes catalysts where the Group VI metal is in either the oxide or the sulfide state on a support, unless otherwise specified. For convenience, a Group VI metal catalyst may also be referred to as a Group VI metal sulfide catalyst, as it is understood by those of skill in the art that the sulfide phase is the active metal phase. In this document, a supported Group VIII non-noble metal catalyst is defined as a catalyst that includes one or more Group VIII non-noble metals on a support. A supported Group VIII non-noble metal catalyst is further defined to exclude the presence of Group VI metals as part of the catalyst. The definition herein of a Group VIII non-noble metal catalyst includes catalysts where the Group VIII metal is in either the oxide or the sulfide state on a support, unless otherwise specified. For convenience, a Group VIII non-noble metal catalyst may also be referred to as a Group VIII non-noble metal sulfide catalyst, as it is understood by those of skill in the art that the sulfide phase is the active metal phase. In this document, a supported catalyst that includes both Group VI metals and Group VIII non-noble metals will be explicitly referred to as including both Group VI and Group VIII metals.

Either a Group VI metal catalyst or a Group VIII non-noble metal catalyst may further include another metal as a physical promoter. Examples of metals that act as physical promoters include alkaline earth metals (corresponding to Group 2 of the modern IUPAC periodic table) such as Mg, and Group IIB transition metals (corresponding to Group 12 of the modern IUPAC periodic table) such as Zn. It is noted that both alkaline earth metals and Group IIB transition metals have the feature of no unpaired electrons in the highest occupied s-orbitals or highest occupied (if any) d-orbitals. Physical promoters are in contrast to metals that act as electronic promoters, such as Co or Ni. As noted above, the Group VI metal catalysts described herein exclude the presence of electronic promoter metals, unless specifically identified as including such a metal.

The amount of Group VI metal supported on a catalyst support can vary depending on the catalyst. Suitable amounts of metals range from about 1 wt % to about 30 wt % relative to the total weight of the catalyst. In some preferred embodiments, the amount of Group VI metal supported on the catalyst can be about 20 wt % or less, such as from about 1 wt % to about 15 wt %, preferably from about 6 wt % to about 12 wt %. The supported Group VI metal sulfide catalyst can also optionally include dopants and/or other metals different from Group VI or Group VIII transition metals. If the supported metal sulfide catalyst includes a non-noble Group VIII metal instead of a Group VI metal, similar metal loadings on the supported catalyst can be used. If the supported metal catalyst includes a physical promoter metal, the amount of physical promoter metal can be less than the amount of Group VI metal (or Group VIII metal) on the catalyst, such as about 5 wt % or less, or about 3 wt % or less.

Another option is to use a supported Group VI metal catalyst or supported Group VIII non-noble metal catalyst that consists essentially of one or more Group VI metals (or alternatively one or more non-noble Group VIII metals) on a refractory support. Such a catalyst can include a Group VI metal (or a Group VIII metal) on a support such as alumina, silica, titania, zirconia, amorphous carbon or a combination thereof. A catalyst that consists essentially of a Group VI metal (or a non-noble Group VIII metal) on a support does not include more than incidental amounts of dopants, such as phosphorous, fluorine, or boron. A catalyst that consists essentially of a metal on a support also does not include more than incidental amounts of other types of transition metals as catalytic metals, such as Group V metals. However, as noted above, the support may contain transition metal oxides, such as oxides of titanium or zirconium.

Still another option is to use a physically promoted Group VI metal catalyst or a physically promoted Group VIII non-noble metal catalyst that consists essentially of one or more Group VI metals (or alternatively one or more Group VIII non-noble metals) and one or more physical promoter metals on a refractory support. Such a catalyst can include a Group VI metal (or a non-noble Group VIII metal) and a physical promoter metal on a support such as alumina, silica, titania, zirconia, amorphous carbon, or a combination thereof. A catalyst that consists essentially of a Group VI metal (or non-noble Group VIII metal) and a physical promoter metal on a support does not include more than incidental amounts of dopants, such as phosphorous, fluorine, or boron. A catalyst that consists essentially of a Group VI metal (or a non-noble Group VIII metal) and a physical promoter metal on a support also does not include more than incidental amounts of other types of transition metals or transition metal sulfides, such as Group V metal sulfides. However, as noted above, the support may contain transition metal oxides, such as oxides of titanium or zirconium.

Examples of preferred single metal catalysts include catalysts containing Mo; Co; and W. That is that the single metal catalyst can be a Mo containing catalyst, or alternatively, a Co containing catalyst, or alternatively, a W containing catalyst. Examples of preferred physically promoted catalysts include catalysts containing ZnMo; ZnW; MgMo; and MgW. That is that the physically promoted catalyst can be a ZnMo containing catalyst, or alternatively, a ZnW containing catalyst, or alternatively, a MgMo containing catalyst, or alternatively, a MgW containing catalyst.

The supported Group VI metal catalyst or supported Group VIII non-noble metal catalyst can be provided in a reactor in one or more catalyst beds. For example, a convenient bed length in some reactors is a bed length of about 25 feet to 30 feet. Such a bed length reduces difficulties in a catalyst bed associated with poor flow patterns. Due to the low reactivity of some Group VI metal catalysts or Group VIII non-noble metal catalysts, such as sulfided Mo or W catalysts, multiple beds may be preferable for achieving a desired level of deoxygenation.

Typical effective conditions for processing a feedstock containing triglycerides to remove oxygen can include conditions effective for hydrodeoxygenation, decarbonylation, and/or decarboxylation. In some embodiments, such as embodiments including a sulfided Mo catalyst, the effective conditions can be selected to increase the selectivity for removing oxygen via hydrodeoxygenation rather than via decarbonylation or decarboxylation. A variety of conditions may be suitable as effective conditions. The pressure during processing of a feedstock for oxygen removal can correspond to a hydrogen partial pressure of about 400 psig (2.8 MPag) or less. At pressures of 400 psig or less, a Group VI metal catalyst or a Group VIII non-noble metal catalyst (optionally with additional physical promoter metals) will perform little or no sulfur removal on a feed. Lower hydrogen partial pressures are also beneficial for reducing or minimizing the amount of olefin saturation, including the amount of saturation from propylene to propane that occurs during deoxygenation. However, the Group VI metal catalysts or Group VIII non-noble metal catalysts, optionally with additional physical promoter metals, are effective for oxygen removal at such hydrogen partial pressures. Depending on the nature of the feed, still lower pressures may be suitable for deoxygenation, such as a total pressure of about 300 psig (2.1 MPag) with a hydrogen partial pressure of about 200 psig (1.4 MPag) or less. Alternatively, higher partial pressures of hydrogen can also be used, such as a hydrogen partial pressure of between about 200 psig (1.4 MPag) to about 2000 psig (14 MPag), such as from about 400 psig (2.8 MPag) to about 1000 psig (6.9 MPag). Higher hydrogen partial pressures can be effective for maintaining a given deoxygenation activity while increasing the throughput of a reactor. However, higher hydrogen partial pressures may reduce the selectivity of the catalyst for performing deoxygenation versus olefin saturation.

The effective conditions for oxygen removal can also include a temperature, a hydrogen treat gas rate, and a liquid hourly space velocity (LHSV). Suitable effective temperatures can be from about 230° C. to about 375° C., such as at least about 250° C. or less than about 350° C. The LHSV can be from about 0.1 $hr^{-1}$ to about 10 $hr^{-1}$, such as from about 0.2 $hr^{-1}$ to about 5.0 $hr^{-1}$. The hydrogen treat gas rate can be any convenient value that provides sufficient hydrogen for deoxygenation of a feedstock. Typical values can range from about 500 scf/B (84 $Nm^3/m^3$) to about 10,000 scf/B (1685 $Nm^3/m^3$). One option for selecting a treat gas rate can be to select a rate based on the expected stoichiometric amount of hydrogen for complete deoxygenation of the feedstock. For example, many types of biocomponent feeds have a stoichiometric hydrogen need for deoxygenation of between 200 scf/B (34 $Nm^3/m^3$) to about 1500 scf/B (253 $Nm^3/m^3$), depending on the mechanism for oxygen removal. The hydrogen treat gas rate can be selected based on a multiple of the stoichiometric hydrogen need, such as at least about 1 times the hydrogen need, or at least about 1.5 times the hydrogen need, or at least about 2 times the hydrogen need.

An additional consideration during deoxygenation is maintaining the sulfided state of the catalyst. If little or no sulfur is present in the reaction environment, the sulfided metal on the catalyst will have a tendency to be reduced and/or converted to oxide form, leading to reduced deoxygenation activity for the catalyst. To maintain catalyst activity, some sulfur can be introduced into the reaction environment. The sulfur can be introduced as sulfur in a mineral feed that is blended with the triglyceride-containing biocomponent feed. Additionally or alternately, sulfur can be introduced as part of the gas phase environment, such as by using an $H_2$ source that contains some $H_2S$. The amount of sulfur present in the reaction environment can be at least about 100 wppm, such as at least about 200 wppm or at least about 500 wppm. If this sulfur is introduced as a gas phase component (such as $H_2S$), the sulfur can be easily removed from any liquid products using a gas-liquid separation. If the sulfur is introduced as part of the feed, it may be feasible to blend the resulting products to achieve an acceptable sulfur level in any final product. Alternatively, subsequent hydroprocessing can be used to reduce the sulfur level of the products, if olefin preservation is not desired.

The effective conditions for deoxygenation can be suitable for reducing the oxygen content of the feed to less than about 1.0 wt %, such as less than about 0.5 wt % or less than about 0.2 wt %. Although the stoichiometric hydrogen need is calculated based on complete deoxygenation, reducing the oxygen content to substantially zero is typically not required to allow further processing of the deoxygenated feed in conventional equipment. Alternatively, in some aspects the effective conditions can be selected to perform at least a partial deoxygenation of the feedstock. A partial deoxygenation corresponds to conditions suitable for reducing the oxygen content of the feed by at least about 40%, such as by at least about 50% or at least about 75%. Without being bound by any particular theory, it is believed that separation of the side chains of a triglyceride from the three carbon backbone occurs relatively early during deoxygenation of a feed. As a result, when propylene production is desired, partial deoxygenation of a triglyceride-containing feed can be beneficial for generating propylene while reducing or mitigating olefin saturation. Similarly, partial deoxygenation may be sufficient to make a resulting deoxygenated effluent suitable for oligomerization while reducing or mitigating olefin saturation.

Properties of Deoxygenated Product

Triglycerides derived from biological sources typically include one or more olefins in some or all of the fatty acid chains attached to the glycerol backbone. For naturally occurring triglycerides, a variety of fatty acid chains will be present, with variations between the fatty acid chains present even within a single triglyceride. The fatty acid chains in a triglyceride from a biological source commonly have between 1 to 2 olefins per fatty acid chain, such as an average of about 1.5. During deoxygenation of a biocomponent feed with a conventional hydrotreating catalyst, such olefins are readily saturated, resulting in loss of 75% or more of the olefins originally present in the fatty acid chains. By contrast, deoxygenation of a biocomponent feed in the presence of a single transition metal sulfide catalyst (or a physically promoted transition metal sulfide catalyst) can allow for deoxygenation of the feed while preserving an increased amount of olefins present in the fatty acid chains. Typically, olefins occurring naturally in a fatty acid chain that is part of a triglyceride will be internal olefins, as opposed to alpha olefins.

The amount of olefins present in a diesel boiling range product produced by deoxygenation of a triglyceride-containing feed can vary depending on a variety of factors. These factors include the number of olefins present in the feed, the type of catalyst, and the deoxygenation conditions. Since the olefins present after deoxygenation represent olefins that were preserved during deoxygenation, the olefins will typically be internal olefins. This is in contrast to alpha olefins, which sometimes can be created under sufficiently severe conditions in the presence of catalysts that include a Group VIII metal. By contrast, deoxygenation of a biocomponent feed in the presence of a single transition metal sulfide catalyst (or a physically promoted transition metal sulfide catalyst) can allow for deoxygenation of the feed while preserving an increased amount of olefins present in the fatty acid chains. Relative to the number of diesel boiling range molecules, the number of diesel boiling range molecules containing an olefin can be at least about 10% of the molecules, such as at least about 20%, and preferably at least about 30% or at least about 40%.

Another method for characterizing the olefin content of a feed or product is in terms of the number of olefin bonds (carbon-carbon double bonds) relative to the number of "paraffin bonds" (carbon-carbon single bonds). For example, an alkane containing 17 carbon atoms will have 16 carbon-carbon single bonds. A corresponding 17 carbon atom molecule with one olefin bond will have 15 carbon-carbon single bonds and 1 carbon-carbon double bond. Such an alkene would have a ratio of olefin bonds to paraffin bonds of 1/15=0.067. This type of ratio is defined herein as an olefin to paraffin ratio.

The fatty acid side chains of a typical triglyceride molecule have an average of about 1.5 olefins per side chain. For a 12 carbon side chain, this corresponds to an olefin to paraffin ratio of 1.5/9.5 or 0.158. For an 18 carbon side chain, this corresponds to an olefin to paraffin ratio of 1.5/15.5 or 0.097. One indicator of the amount of olefin saturation is the olefin to paraffin ratio for the resulting diesel or distillate product after deoxygenation. Depending on the embodiment, the olefin to paraffin ratio for a deoxygenated product can be at least about 0.04, such as at least about 0.05 and preferably at least about 0.06 or at least about 0.075.

A diesel fuel or diesel fuel additive that includes olefinic molecules will have different properties than a similar diesel fuel or diesel fuel additive containing only paraffinic molecules. The presence of one or more olefins typically lowers the cetane rating of a molecule relative to a paraffinic molecule having the same number of carbon atoms. The presence of one or more olefins also typically improves the cold flow properties of a molecule, such as by reducing the cloud point or pour point relative to a paraffinic molecule having the same number of carbons.

This exchange of a lower cetane rating for improved cold flow properties can be beneficial for a diesel fuel or fuel additive based on a biocomponent feed. Due to the length of the carbon chains present in typical fatty acid chains in triglycerides, the cetane rating of a diesel based on a biocomponent feed is typically greater than 60 for a primarily paraffinic diesel fuel sample. Although preserving olefins reduces the cetane, the cetane number for olefinic diesel boiling range molecules from a biocomponent feed is still greater than about 60. A typical diesel fuel specification requires a cetane rating of between 40 and 50. Thus, a diesel fuel or diesel fuel additive derived from a biocomponent feed is beneficial for the cetane rating when blended with a typical mineral diesel fuel. However, even though diesel fuels from biocomponent sources are suitable based on cetane rating, the amount of such fuels that can be blended with a mineral feed is conventionally limited due to poor cold flow properties. By preserving an increased number of the naturally occurring olefins in a diesel fuel derived from a biocomponent source, an increased amount of the biocomponent diesel fuel can be blended with a mineral diesel fuel while still preserving desired cold flow properties.

As an example, n-octadecane ($C_{18}H_{38}$) has a melting point of 30° C., a cetane number of 102.6, and a kinematic viscosity at 100° F. (38° C.) of 4.13 centistokes. Although the cetane number of n-octadecane is high, this molecule is a solid at room temperature. This limits the amount of n-octadecane that can be present in a diesel fuel. A corresponding molecule with one olefin, octadecene ($C_{18}H_{36}$) also has a relatively high cetane number of 90. However, the melting point for octadecene is 18° C. and the kinematic viscosity at 100° F. (38° C.) is 3.53 centistokes. Due to the more favorable properties of octadecene, a larger amount of octadecene can be added to a diesel fuel or diesel fuel additive while maintaining cold flow properties for the overall combined diesel fuel that will satisfy a cold flow specification.

One option for use of an olefinic diesel fuel or diesel fuel additive is to blend the olefinic diesel with a conventional diesel, such as a conventional diesel that has not been dewaxed to improve the cold flow properties of the diesel. For example, an olefinic diesel containing at least about 40 wt % olefins can be blended with a conventional diesel so that at least about 25 wt % of the blended diesel product corresponds to the olefinic diesel. This blending can be used to reduce the cloud point and/or the pour point of the blended diesel product relative to the conventional diesel by at least about 3° C.

In addition to providing improved cold flow properties, preserving olefins can reduce the amount of hydrogen consumption required to deoxygenate a feed from a biocomponent source. Under conventional hydrotreating conditions, substantially all olefins present in a diesel boiling range feed will be saturated during a deoxygenation process. For a triglyceride feed with an average of 1.5 olefins per fatty acid chain, the hydrogen required for saturation of olefins can correspond to roughly 200 scf/B (33.7 $Nm^3/m^3$) to 300 scf/B (50.5 Nm$^3$/m$^3$) of hydrogen in addition to the hydrogen required for deoxygenation. In another example, some proposed diesel feeds from biologically derived sources include substantial amounts of eicosapentaenoic acids, which are fatty acids with 20 total carbons and 5 olefin bonds. A feed of eicosapentaenoic acid would require over 2000 scf/B (337 Nm$^3$/m$^3$) of hydrogen just for saturation of olefins. Any olefins that are preserved during deoxygenation of such feeds will result in a corresponding decrease in the amount of hydrogen consumed during deoxygenation. For example, reaction conditions that preserve 50% of the olefins present in a triglyceride containing feed will result in a corresponding roughly 50% decrease in the amount of hydrogen consumed for olefin saturation. The hydrogen consumed by the actual deoxygenation reactions is not directly impacted by the preservation of olefins in a feed. In addition to reducing hydrogen consumption, olefin preservation also reduces the exotherm generated due to olefin saturation.

Oligomer Formation

In addition to providing a diesel fuel product with improved cold flow properties, maintaining or preserving olefins during deoxygenation of a biocomponent feed can also allow for oligomerization of the resulting product to form a product having a higher boiling range, such as molecules boiling in a lubricant base oil boiling range. Such an oligomer can be suitable, for example, for use in a lubricant base oil or as a wax. To avoid any ambiguity, oligomerization is defined herein to include formation of a dimer.

Oligomerization of olefinic molecules can be performed using any convenient method. For example, oligomerization can be performed by exposing olefins to an acidic catalyst under effective oligomerization conditions. Examples of suitable acidic catalysts include MCM-49, MCM-56, zeolite USY, acidic clays such as montmorillonite, sulfated $ZrO_2$, and tungsten oxide ($WO_x$, where x is between 0 to 3). Optionally, the acidic catalyst can be bound or supported using a suitable support material. Examples include refractory oxides such as alumina, titania, or zirconia. Effective oligomerization conditions include a temperature from about 180° C. to about 250° C. The olefins can be exposed to the catalyst at a pressure from about 300 psig (2.1 MPag) to about 1000 psig (6.9 MPag), such as pressure provided by pressurizing with $N_2$ or another inert gas. Hydrogen is not required as a reagent for the oligomerization reaction. The olefins can be exposed to the acidic catalyst at a space velocity from about 0.1 hr$^{-1}$ to about 10.0 hr$^{-1}$ LHSV.

Figures 4A, 4B, 4C:
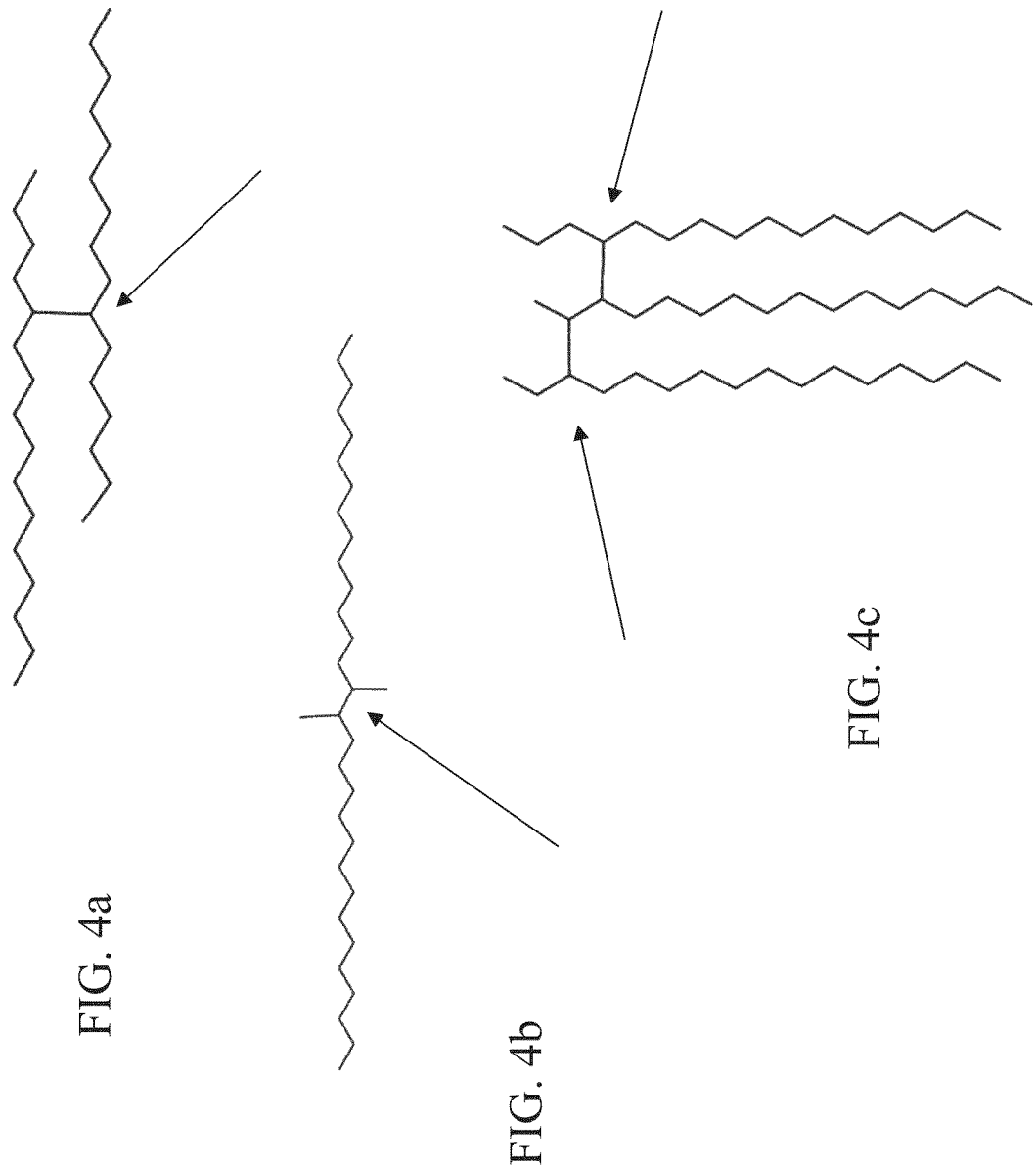
FIGS. 4A, 4B, and 4C each depict a potential structure for an oligomer formed according to an embodiment of the invention.

FIGS. 4a-4c shows examples of molecules formed by oligomerization of hexadecene. The arrows in FIGS. 4a-4c show the location where a cross-linking bond has formed between two reactant molecules to form an oligomer. FIGS. 4a and 4b show dimers formed from various types of hexadecene that have an appropriate boiling range for use in a lubricant base oil. FIG. 4a shows a dimer formed from hexadecene molecules having internal olefins. FIG. 4b shows a dimer formed when at least one of the hexadecene molecules corresponds to an alpha olefin. FIG. 4c shows a trimer formed using hexadecene molecules. This type of trimer is potentially suitable for use as a wax.

Further Hydroprocessing of Product Fractions

After any optional separation of propylene and/or any optional oligomerization, it may be desirable to further hydroprocess the liquid effluent. An example of further processing can be to catalytically dewax the liquid effluent to improve the cold flow properties of the effluent. Because some types of dewaxing catalysts are sensitive to the presence of oxygen, it may also be desirable to hydrotreat the liquid effluent prior to dewaxing. This will typically reduce the olefin content of the liquid effluent, but the subsequent dewaxing can offset or even result in a net improvement of the cold flow properties of a diesel product formed from the liquid effluent.

A suitable catalyst for hydrotreatment can comprise, consist essentially of, or be a catalyst composed of one or more Group VIII and/or Group VIB metals on a support such as a metal oxide support. Suitable metal oxide supports can include relatively low acidic oxides such as silica, alumina, silica-aluminas, titania, zirconia, or a combination thereof. The supported Group VIII and/or Group VIB metal(s) can include, but are not limited to, Co, Ni, Fe, Mo, W, Pt, Pd, Rh, Ir, and combinations thereof. Individual hydrogenation metal embodiments can include, but are not limited to, Pt only, Pd only, or Ni only, while mixed hydrogenation metal embodiments can include, but are not limited to, Pt and Pd, Pt and Rh, Ni and W, Ni and Mo, Ni and Mo and W, Co and Mo, Co and Ni and Mo, Co and Ni and W, or another combination. When only one hydrogenation metal is present, the amount of that hydrogenation metal can be at least about 0.1 wt % based on the total weight of the catalyst, for example at least about 0.5 wt % or at least about 0.6 wt %. Additionally or alternately when only one hydrogenation metal is present, the amount of that hydrogenation metal can be about 5.0 wt % or less based on the total weight of the catalyst, for example about 3.5 wt % or less, about 2.5 wt % or less, about 1.5 wt % or less, about 1.0 wt % or less, about 0.9 wt % or less, about 0.75 wt % or less, or about 0.6 wt % or less. Further additionally or alternately when more than one hydrogenation metal is present, the collective amount of hydrogenation metals can be at least about 0.1 wt % based on the total weight of the catalyst, for example at least about 0.25 wt %, at least about 0.5 wt %, at least about 0.6 wt %, at least about 0.75 wt %, or at least about 1 wt %. Still further additionally or alternately when more than one hydrogenation metal is present, the collective amount of hydrogenation metals can be about 35 wt % or less based on the total weight of the catalyst, for example about 30 wt % or less, about 25 wt % or less, about 20 wt % or less, about 15 wt % or less, about 10 wt % or less, or about 5 wt % or less. In embodiments wherein the supported metal comprises a noble metal, the amount of noble metal(s) is typically less than about 2 wt %, for example less than about 1 wt %, about 0.9 wt % or less, about 0.75 wt % or less, or about 0.6 wt % or less. The amounts of metal(s) may be measured by methods specified by ASTM for individual metals, including but not limited to atomic absorption spectroscopy (AAS), inductively coupled plasma-atomic emission spectrometry (ICP-AAS), or the like.

Hydrotreating conditions can typically include temperatures of about 550° F. (288° C.) to about 750° F. (399° C.), hydrogen partial pressures of from about 250 psig to about 5000 psig (1.8 MPag to 34.6 MPag), liquid hourly space velocities of from 0.05 h$^{-1}$ to 10 h$^{-1}$, and hydrogen treat gas rates of from 35.6 sm$^3$/m$^3$ to 1781 sm$^3$/m$^3$ (200 SCF/B to 10,000 SCF/B). In other embodiments, the conditions can include temperatures in the range of about 600° F. (343° C.) to about 700° F. (371° C.), hydrogen partial pressures of from about 500 psig to about 3000 psig (3.5 MPag-20.9 MPag), liquid hourly space velocities of from about 0.2 h$^{-1}$ to about 2 h$^{-1}$ and hydrogen treat gas rates of from about 213 sm$^3$/m$^3$ to about 1068 sm$^3$/m$^3$ (1200 SCF/B to 6000 SCF/B). The different ranges of temperatures can be used based on the type of feed and the desired hydrotreatment result.

Suitable dewaxing catalysts can include molecular sieves such as crystalline aluminosilicates (zeolites). In an embodiment, the molecular sieve can comprise, consist essentially of, or be ZSM-5, ZSM-22, ZSM-23, ZSM-35, ZSM-48, zeolite Beta, or a combination thereof, for example ZSM-23 and/or ZSM-48, or ZSM-48 and/or zeolite Beta. Optionally but preferably, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Optionally but preferably, the dewaxing catalyst can include a binder for the molecular sieve, such as alumina, titania, silica, silica-alumina, zirconia, or a combination thereof, for example alumina and/or titania or silica and/or zirconia and/or titania.

One characteristic that can impact the activity of the molecular sieve is the ratio of silica to alumina ($Si/Al_2$ ratio) in the molecular sieve. In an embodiment, the molecular sieve can have a silica to alumina ratio of about 200:1 or less, for example about 150:1 or less, about 120:1 or less, about 100:1 or less, about 90:1 or less, or about 75:1 or less. Additionally or alternately, the molecular sieve can have a silica to alumina ratio of at least about 30:1, for example at least about 40:1, at least about 50:1, or at least about 65:1.

Aside from the molecular sieve(s) and optional binder, the dewaxing catalyst can also optionally but preferably include at least one metal hydrogenation component, such as a Group VIII metal. Suitable Group VIII metals can include, but are not limited to, Pt, Pd, Ni, or a combination thereof. When a metal hydrogenation component is present, the dewaxing catalyst can include at least about 0.1 wt % of the Group VIII metal, for example at least about 0.3 wt %, at least about 0.5 wt %, at least about 1.0 wt %, at least about 2.5 wt %, or at least about 5.0 wt %. Additionally or alternately, the dewaxing catalyst can include about 10 wt % or less of the Group VIII metal, for example about 5.0 wt % or less, about 2.5 wt % or less, about 1.5 wt % or less, or about 1.0 wt % or less.

In some embodiments, the dewaxing catalyst can include an additional Group VIB metal hydrogenation component, such as W and/or Mo. In such embodiments, when a Group VIB metal is present, the dewaxing catalyst can include at least about 0.5 wt % of the Group VIB metal, for example at least about 1.0 wt %, at least about 2.5 wt %, or at least about 5.0 wt %. Additionally or alternately in such embodiments, the dewaxing catalyst can include about 20 wt % or less of the Group VIB metal, for example about 15 wt % or less, about 10 wt % or less, about 5.0 wt % or less, about 2.5 wt % or less, or about 1.0 wt % or less. In one preferred embodiment, the dewaxing catalyst can include Pt and/or Pd as the hydrogenation metal component. In another preferred embodiment, the dewaxing catalyst can include as the hydrogenation metal components Ni and W, Ni and Mo, or Ni and a combination of W and Mo.

In various embodiments, the dewaxing catalyst used according to the invention can advantageously be tolerant of the presence of sulfur and/or nitrogen during processing. Suitable catalysts can include those based on zeolites ZSM-48 and/or ZSM-23 and/or zeolite Beta. It is also noted that ZSM-23 with a silica to alumina ratio between about 20:1 and about 40:1 is sometimes referred to as SSZ-32. Additional or alternate suitable catalyst bases can include 1-dimensional 10-member ring zeolites. Further additional or alternate suitable catalysts can include EU-2, EU-11, and/or ZBM-30.

A bound dewaxing catalyst can also be characterized by comparing the micropore (or zeolite) surface area of the catalyst with the total surface area of the catalyst. These surface areas can be calculated based on analysis of nitrogen porosimetry data using the BET method for surface area measurement. Previous work has shown that the amount of zeolite content versus binder content in catalyst can be determined from BET measurements (see, e.g., Johnson, M. F. L., *Jour. Catal.*, (1978) 52, 425). The micropore surface area of a catalyst refers to the amount of catalyst surface area provided due to the molecular sieve and/or the pores in the catalyst in the BET measurements. The total surface area represents the micropore surface plus the external surface area of the bound catalyst. In one embodiment, the percentage of micropore surface area relative to the total surface area of a bound catalyst can be at least about 35%, for example at least about 38%, at least about 40%, or at least about 45%. Additionally or alternately, the percentage of micropore surface area relative to total surface area can be about 65% or less, for example about 60% or less, about 55% or less, or about 50% or less.

Catalytic dewaxing can be performed by exposing a feedstock to a dewaxing catalyst under effective (catalytic) dewaxing conditions. Effective dewaxing conditions can include can be carried out at temperatures of about 550° F. (288° C.) to about 840° F. (449° C.), hydrogen partial pressures of from about 250 psig to about 5000 psig (1.8 MPag to 34.6 MPag), and hydrogen treat gas rates of from 35.6 $sm^3/m^3$ to 1781 $sm^3/m^3$ (200 SCF/B to 10,000 SCF/B). In other embodiments, the conditions can include temperatures in the range of about 600° F. (343° C.) to about 815° F. (435° C.), hydrogen partial pressures of from about 500 psig to about 3000 psig (3.5 MPag-20.9 MPag), and hydrogen treat gas rates of from about 213 $sm^3/m^3$ to about 1068 $sm^3/m^3$ (1200 SCF/B to 6000 SCF/B). The liquid hourly space velocity (LHSV) of the feed relative to the dewaxing catalyst can be characterized can be from about 0.1 $hr^{-1}$ to about 10 $hr^{-1}$.

Separation of Propylene from Gas Phase Components

After performing a deoxygenation under effective conditions in the presence of a Group VI metal catalyst or Group VIII non-noble metal catalyst, propylene will typically be present as one of a variety of gas phase components. These gas phase components can also include, but are not limited to, other deoxygenation reaction products such as $H_2O$, $CO_2$, and/or CO; gases present in the reaction environment, such as $H_2$, $H_2S$, $N_2$, and/or other inert gases; potential light ends cracking products from the deoxygenation reaction; and propane, which is the expected typical product generated from the glycerol backbone of a triglyceride during a deoxygenation reaction.

In order to recover propylene, the gas phase products can first be separated from the liquid products from the deoxygenation reaction, which will typically be diesel boiling range and/or naphtha boiling range molecules. The propylene can then be separated from the remaining gas phase components. Due to the similarity in boiling point between propane and propylene, simple distillation techniques may not be effective. One option for distillation is to use a distillation method with a sufficiently large number of tray equivalents, so that the separation of propane from propylene can be performed in spite of the similarity in boiling point. Any convenient method for providing a distillation column with a sufficient number of equivalent trays can be used. For example, cryogenic distillation columns may be beneficial for propane-propylene separations. Depending on the embodiment, at least about 0.5 wt % of propylene can be recovered relative to the weight of the input feed, such as at least about 1.0 wt %, or at least about 2.0 wt %. Alternatively, the amount of propylene recovery can be expressed relative to the weight of triglycerides in the input feed. Propylene formed according to the invention will primarily form based on separation of the glycerol backbone in triglycerides from the side chains. This is in contrast to propylene formed by more severe processing methods, such as propylene formed by cracking of a feed. Depending on the embodiment, at least about 1 wt % of propylene can be recovered relative to the weight of triglycerides in the input feed, such as at least about 1.5 wt % or at least about 2.0 wt %.

Another option for separating propylene from a gas phase mixture is to use a gas separation train similar to the separation trains used in some fluid catalytic cracking (FCC) reaction systems. Propylene is also an output product from FCC reactions. One option is to introduce the gas phase output from deoxygenation to the gas processing train of an existing FCC reaction system to perform propylene recovery. The gas phase output from deoxygenation can optionally be processed prior to feeding the gas phase output into the FCC gas processing train. For example, the gas phase output can be passed through an amine scrubber to remove contaminant species such as $H_2S$ or $CO_2$. Another option is to use a pressure swing adsorber system to remove $CO_2$ and/or $CO_2$.

The gas phase output from the deoxygenation reaction can be separated from the liquid phase output at any convenient time. One option is to perform a gas-liquid separation after the feed has passed through all stages of the deoxygenation reaction. Another option is to perform an intermediate separation. For example, a Group VI metal catalyst or Group VIII non-noble metal catalyst for performing deoxygenation may be provided in a plurality of catalyst beds. At least a portion of the gas phase output can be withdrawn from the deoxygenation reaction system between such catalyst beds. Withdrawing at least a portion of the gas phase output at an intermediate stage will reduce the amount of catalyst that at least some of the propylene is exposed to. This reduces the amount of propylene lost to subsequent olefin saturation by the Group VI metal catalyst (or Group VIII non-noble metal catalyst) in later portions of the deoxygenation catalyst bed(s).

Examples of Processing Configurations

FIG. 1 schematically shows an example of a processing configuration suitable for deoxygenating a biocomponent feed. The configuration in FIG. 1 also provides for separation of a propylene output from the deoxygenation products. In FIG. 1, a source of biocomponent feed 102 provides a feedstock for processing. Any convenient source 102 can be used, such as tankage for storing a biocomponent feed until it is ready for use. Preferably, the biocomponent feed is a feed that contains triglycerides. Optionally, the output 103 from biocomponent feed source 102 is passed through a feed surge drum 104 to improve the consistency of the flow rate from the feed source. The output 105 from optional feed surge drum 104 is then passed into a reactor 110. The output 105 is can be heated (not shown) prior to entering reactor 110. A hydrogen flow 109 is also introduced into reactor 110, which although the hydrogen flow is shown in FIG. 1 as co-current with the feed, the hydrogen flow 109 may alternatively additionally introduced into reactor 110 counter-current to the feed. The hydrogen flow 109 can be from a fresh hydrogen source, or the hydrogen flow can be at least partially based on an exit hydrogen flow from another reaction, such as the hydrogen output from a hydroprocessing reaction. In FIG. 1, reactor 110 is shown as having two stages 113 and 117 for deoxygenation. Each stage corresponds to a bed of catalyst, such as a Group VI metal catalyst or a Group VIII non-noble metal catalyst. Optionally, the Group VI metal catalyst or Group VIII non-noble metal catalyst can also include a physical promoter metal, such as Mg or Zn. Alternatively, reactor 110 can include any convenient number of beds of catalyst, or reactor 110 can even correspond to multiple reactors.

In FIG. 1, two output streams are generated from reactor 110. A primary output stream 115 exits from the reactor after passing through both stage 113 and 117. The output stream 115 includes both a gas phase and a liquid phase effluent that is passed into gas-liquid separator(s) 122 for separation. Optionally, a second gas phase output stream 119 can also be withdrawn from reactor 110 at a location between stages or beds 113 and 117. Withdrawing a gas phase output stream 119 prior to the second stage is beneficial for preserving propylene. By withdrawing the gas phase output stream between the beds, any propylene formed during the deoxygenation reaction in bed or stage 113 is not exposed to the additional catalyst in stage 117, thus reducing the likelihood that propylene formed in stage 113 will be converted to propane.

Separator (or separators) 122 separate the outputs from reactor 110 into a gas phase output 123 and a liquid phase output 145. Liquid phase output 145 is suitable for further processing as a diesel boiling range product (and/or possibly a naphtha and/or lubricant boiling range product). Gas phase output 123 will typically include a variety of species, such as one or more of $H_2S$, $H_2O$, $CO_2$, $NH_3$, CO, and hydrocarbons with short carbon chain lengths, such as $C_1$-$C_4$ hydrocarbons. The gas phase output 123 can be purified to isolate a desirable product, such as propylene, from other impurities generated during deoxygenation, such as $H_2S$ or $CO_2$. In an initial purification step, a cold separation device 124 is shown for removing water from the gas phase output. This generates a water output stream 129 and a stream 125 containing the remaining gas phase species. An amine scrubber 130 or other separation device for removing $H_2S$ and $CO_2$ can then be used to purify stream 125. For the amine scrubber shown in FIG. 1, a counter-current flow of an amine such monoethanol amine can be introduced 133 into scrubber 130 for removal of $H_2S$ and/or $CO_2$. The monoethanol amine enriched in the gas phase impurities is withdrawn 139 from the scrubber for recycling of the amine. The remaining stream 135 that includes at least propylene can be passed into a system for performing separations on compounds with similar boiling points, such as a cryogenic separator or an existing FCC separation system. Although not shown, a pressure swing adsorption unit could be employed in addition to or in place of amine scrubber 130 to further assist with removal of CO and/or $CO_2$.

Figure 2:
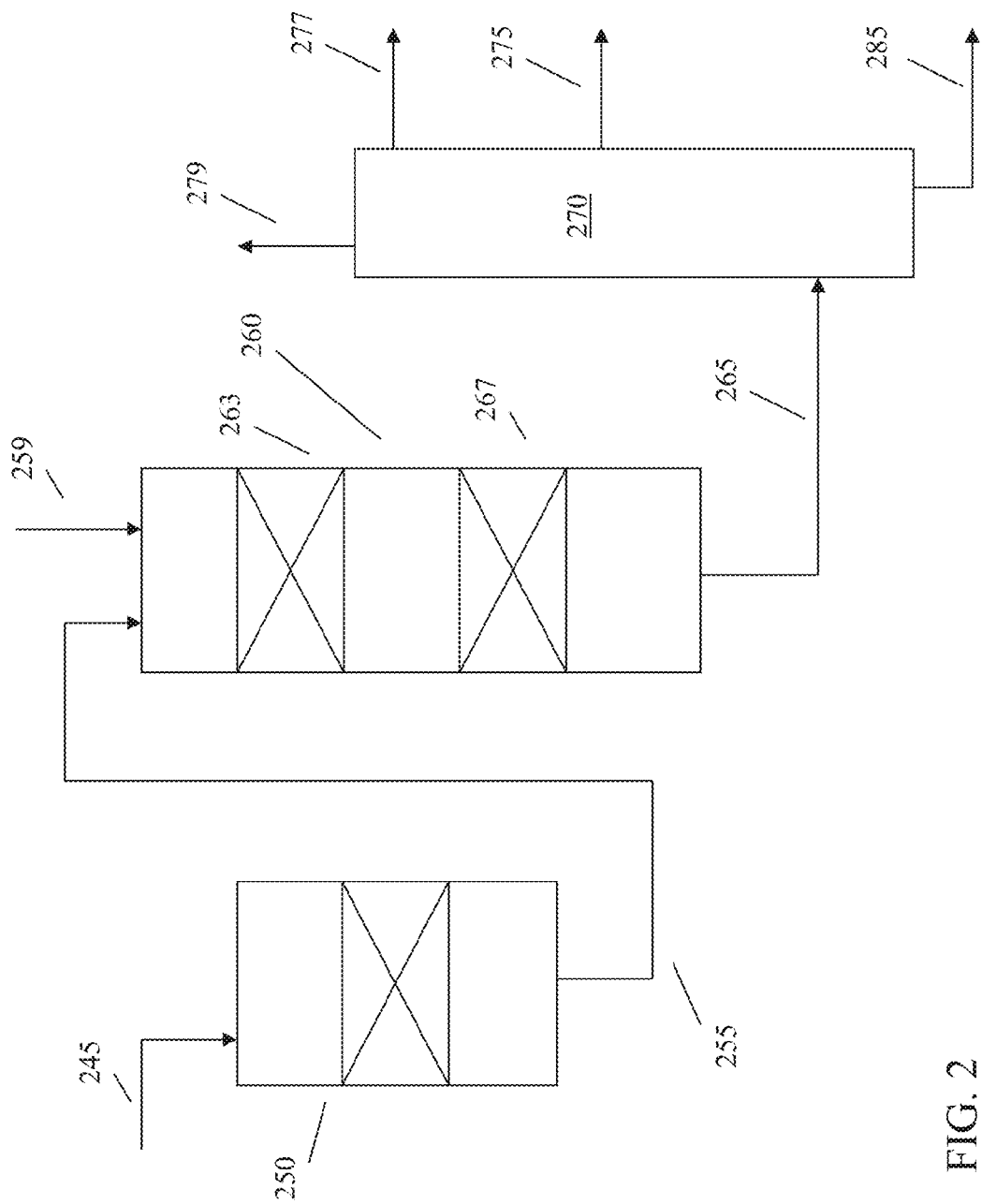
FIG. 2 schematically shows a reaction system suitable for performing a process according to an embodiment of the invention.

FIG. 2 schematically shows an example of a reaction system suitable for processing a diesel boiling range input stream that includes olefinic diesel. In FIG. 2, input stream 245 corresponds to a diesel boiling range stream where at least a portion of the diesel boiling range molecules are olefins, such as a stream generated by deoxygenation of a biocomponent feed in the presence of a single metal sulfide catalyst. The various types of processing shown in FIG. 2 represent optional processes that can be performed on a diesel boiling range stream. While these optional processes are not necessary, the optional processes can improve the diesel boiling range stream by removing any remaining oxygen, improving cold flow properties, and/or oligomerizing the stream to produce higher boiling molecules.

If desired, an input stream 245 is exposed to an acidic catalyst in reactor 250 to form oligomers from olefins in the feed. This optional process of exposing the olefin-containing feed to an acidic catalyst converts a portion of the diesel boiling range molecules into lubricant boiling range molecules and/or waxy molecules, depending on the degree of oligomerization.

The output 255 from optional reactor 250 is then passed into a reactor 260 for hydrotreatment, catalytic dewaxing, or a combination thereof. FIG. 2 shows an example where the optionally oligomerized feed is hydrotreated and then catalytically dewaxed in reactor 260. Reactor 260 is shown as including a stage 263 for hydrotreatment of a feed and a downstream stage 267 for catalytic dewaxing. The hydrotreatment stage 263 is used to perform hydrotreatment under mild conditions to complete the removal of any oxygen remaining in stream 255. Preferably, the hydrotreatment conditions are effective for removal of any remaining oxygen while reducing or minimizing the amount of olefin saturation. It is noted that the optional oligomerization reaction will consume a portion of the olefins present in the feed, but olefins are likely to still be present to some degree. The mild hydrotreatment allows catalytic dewaxing to be performed 267 using a catalyst that is otherwise sensitive to oxygen content. The catalytic dewaxing improves the cold flow properties of the diesel, lubricant, and/or waxy boiling range molecules present in stream 255. In the example shown in FIG. 2, the hydrogen input 259 for the hydrotreatment and dewaxing reactions is passed into reactor 260 in a co-current manner. In an alternative configuration, hydrogen input 259 can be passed into reactor 260 in a counter-current manner. The effluent 265 from reactor 260 is then passed into a fractionator for separation of the effluent into desired fractions. Examples of fractions generated from an olefinic diesel boiling range feed can include a gas phase or light ends fraction 279, one or more naphtha and/or kerosene fractions 277, one or more diesel fractions 275, and one or more lubricant base stock or heavier fractions 285. The light ends fraction 279 represent molecules created due to cracking of input stream 245 during exposure to either the optional acidic catalyst in reactor 250 or exposure to the optional hydrotreatment and/or dewaxing catalysts in reactor 260. The naphtha or kerosene products 277 can result from cracking in the presence of a deoxygenation catalyst, the acidic catalyst for oligomerization, the hydrotreating catalysts, or the dewaxing catalysts. The diesel boiling range fractions 275 are the expected output from deoxygenation of a biocomponent feed. For example, deoxygenation of a triglyceride-containing feed will typically result in formation of approximately diesel boiling range molecules from the fatty acid chains in the triglycerides. Some of these fatty acid chains may result in olefins or paraffins that boil in the lubricant range, corresponding to fractions 285. Additionally, some lubricant boiling range molecules and/or waxy molecules are formed by oligomerization.

Figure 3:
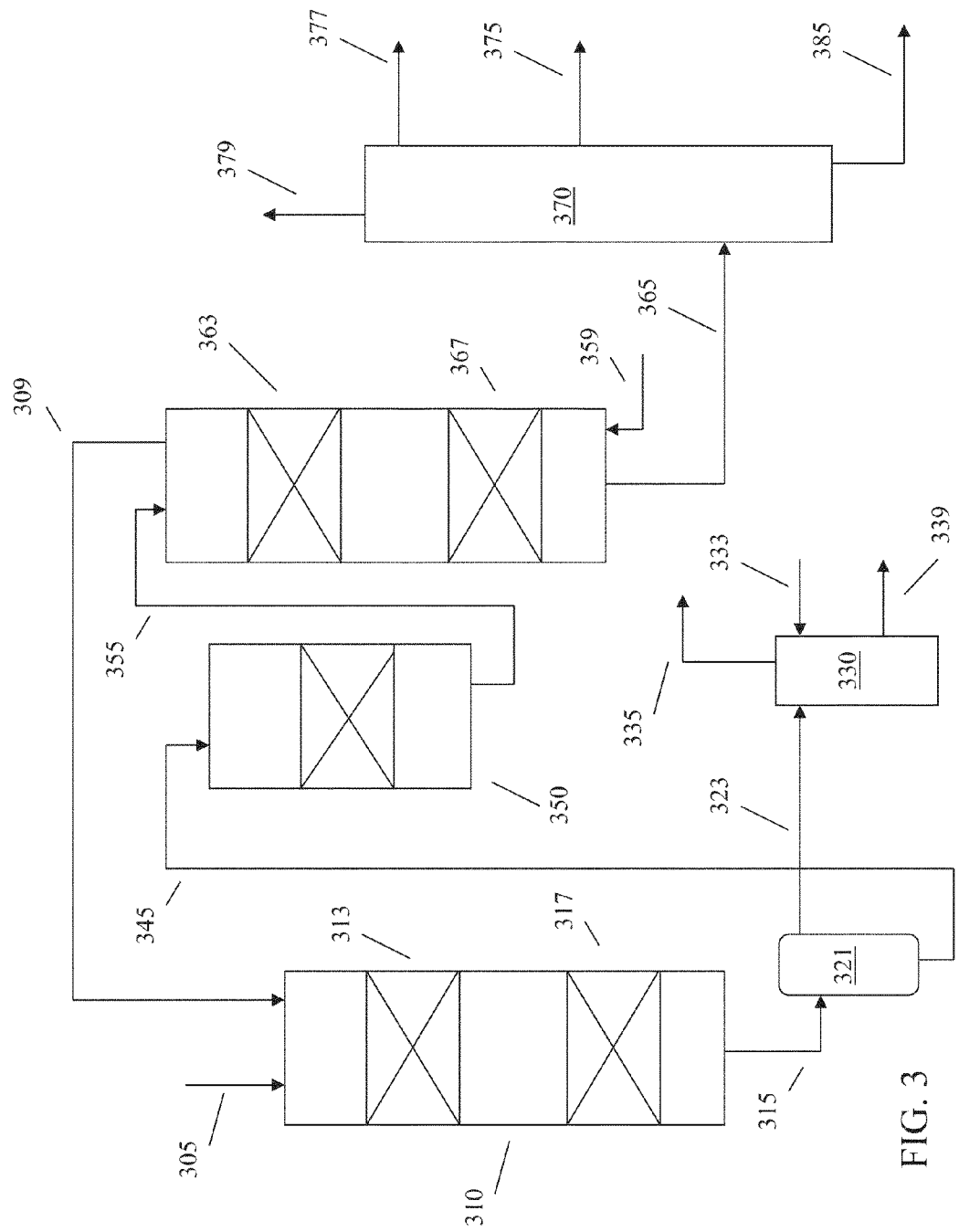
FIG. 3 schematically shows a reaction system suitable for performing a process according to an embodiment of the invention.

FIG. 3 shows an example of a reaction system that combines a deoxygenation process, such as the process shown in FIG. 1, with an oligomerization, hydrotreatment, and dewaxing process as shown in FIG. 2. In FIG. 3, a biocomponent feed 305 is deoxygenated by exposing the feed to a Group VI metal catalyst or Group VIII metal catalyst in the presence of hydrogen in one or more stages in a reactor 310. The example in FIG. 3 shows stages 313 and 317. In FIG. 3, a gas phase product is not withdrawn between stages 313 and 317. The effluent 315 from reactor 310 is separated using one or more separators 321. This results in a gas phase output 323 that can be further processed, such as by an amine scrubber 330, to generate a stream 335 suitable for recovery of propylene. In this example, amine scrubber 330 includes an input of an amine 333 and an output 339 of an amine enriched in contaminant gases such as $H_2S$ or $CO_2$.

Separation of the effluent 315 also results in a liquid phase output 345. Output stream 345 is passed into a reactor 350 containing an acidic catalyst for oligomerization of at least a portion of the olefins present in the output stream 345. The oligomerized output 355 is then hydrotreated 363 under mild conditions in a reactor 360 to remove any excess oxygen prior to dewaxing 367 of the oligomerized output. In the example shown in FIG. 3, the hydrogen input 359 for the dewaxing and hydrotreatment reactions is passed into reactor 360 in a counter-current manner. This further reduced the likelihood that any oxygen containing species will come into contact with the dewaxing catalyst. After passing through reactor 360, the counter-current hydrogen stream 359 exits the reactor and can be used as a hydrogen source 309 for the deoxygenation reactions in reactor 310. In an alternative configuration, hydrogen input 359 can be passed into the reactor in a co-current manner. In such an alternative configuration, the exit flow of hydrogen from the reactor can also be used as the hydrogen source for deoxygenation reactions in reactor 310. Although FIG. 3 shows the output flow of hydrogen from the hydroprocessing reactor as the only hydrogen source, other input streams of hydrogen can be used in place of or in addition to stream 309, including hydrogen from a fresh hydrogen source. After dewaxing, the resulting effluent 365 is fractionated 370 to form various fractions, such as a light ends fraction 379, one or more naphtha or kerosene fractions 377, one or more diesel fractions 375, and one or more lubricant base stock (or heavier) fractions 385.

Example of Deoxygenating Biocomponent Feed with a Metal Sulfide Catalyst

A series of catalysts and conditions were tested in parallel in a multiple catalyst testing apparatus. The test rig included a plurality of reaction vessels contained in an apparatus with an isothermal reaction zone. Each reaction vessel was loaded with either 1.0 cc or 1.5 cc of catalyst, as will be described below. The catalysts were sulfided by exposing the catalysts to a feed spiked with dimethyl disulfide (DMDS) and held at a temperature of at least 450° F. for an extended period of time. Spiking with DMDS resulted in an increase in sulfur concentration from 1.37 wt % to 2.6 wt % of the sulfiding feed. The sulfiding feed had a T10 boiling point of 427° F. and a final boiling point of 777° F. The flow rate of the spiked feed in each reactor during sulfidation was 1.5 cc per hour.

The data presented below includes experiments for metal sulfide catalysts corresponding to a molybdenum sulfide catalyst and a tungsten sulfide catalyst. A commercially available supported CoMo catalyst was also tested for comparison. The molybdenum catalyst initially included about 20 wt % of molybdenum oxide on an alumina support. The molybdenum was converted to sulfide form using the procedure described above. The tungsten catalyst initially included about 20 wt % of tungsten oxide on a silica support prior to sulfidation. The commercially available CoMo catalyst included 20 wt % molybdenum oxide and about 5 wt % cobalt oxide on a silica support prior to sulfidation. The experiments included 4 sets of catalyst conditions. A first reaction vessel contained 1.0 $cm^3$ of the molybdenum catalyst. A second reaction vessel contained 1.0 $cm^3$ of the tungsten catalyst. A third reaction vessel contained 1.5 $cm^3$ of the tungsten catalyst. A fourth reaction vessel contained 1.5 $cm^3$ of the commercially available CoMo catalyst.

After sulfidation, the sulfided catalysts were used to treat a feed composed of soybean oil and dodecane as a diluent. The soybean oil had an oxygen content of 11.0 wt %. Table 1 shows the reaction conditions that were studied.

TABLE 1

Reaction Conditions

| Condition | Temperature (° F.) | Pressure (psig) | Feed Bio Content (wt % bio) | Liquid Feed Rate (cc hr$^{-1}$) |
|---|---|---|---|---|
| 1 | 500 | 400 (2.76 MPag) | 30 | 1.5 |
| 2 | 575 | 400 | 30 | 1.5 |
| 3 | 650 | 400 | 30 | 1.5 |
| 4 | 550 | 400 | 50 | 1.5 |
| 5 | 550 | 1800 (12.4 MPag) | 50 | 1.5 |
| 6 | 475 | 1800 | 50 | 1.5 |
| 7 | 600 | 1800 | 50 | 1.5 |
| 8 | 600 | 1800 | 30 | 2.6 |
| 9 | 550 | 1800 | 30 | 2.6 |
| 10 | 575 | 400 | 30 | 1.5 |

Using the parallel experimental apparatus, each of the four catalyst configurations was tested at each of the ten conditions in Table 1. In addition to the above, at conditions 1-4 the feed included a spiking agent to produce a sulfur level of 500 wppm. The amount of spiking agent was increased to produce a sulfur level of 1 wt % for conditions 5-10. In the following figures, each of the conditions is indicated in the horizontal axis direction by the numbers 1-10 near the top of the graph. Each change in condition is also shown by a dotted dividing line.

As an initial characteristic, the amount of deoxygenation that occurred for each catalyst at each condition was determined. One method for determining the deoxygenation would be to do a total mass balance of all oxygen-containing species in the feed and the products. However, this was not practical to perform on a daily basis, so instead the amount of conversion of molecules from above 322° C. to below 322° C. was measured. For the soybean oil feed used in the experiments, molecules boiling above 322° C. correspond to molecules having greater than 18 carbon atoms, while any deoxygenated products will have 18 carbon atoms or less.

Figure 11:
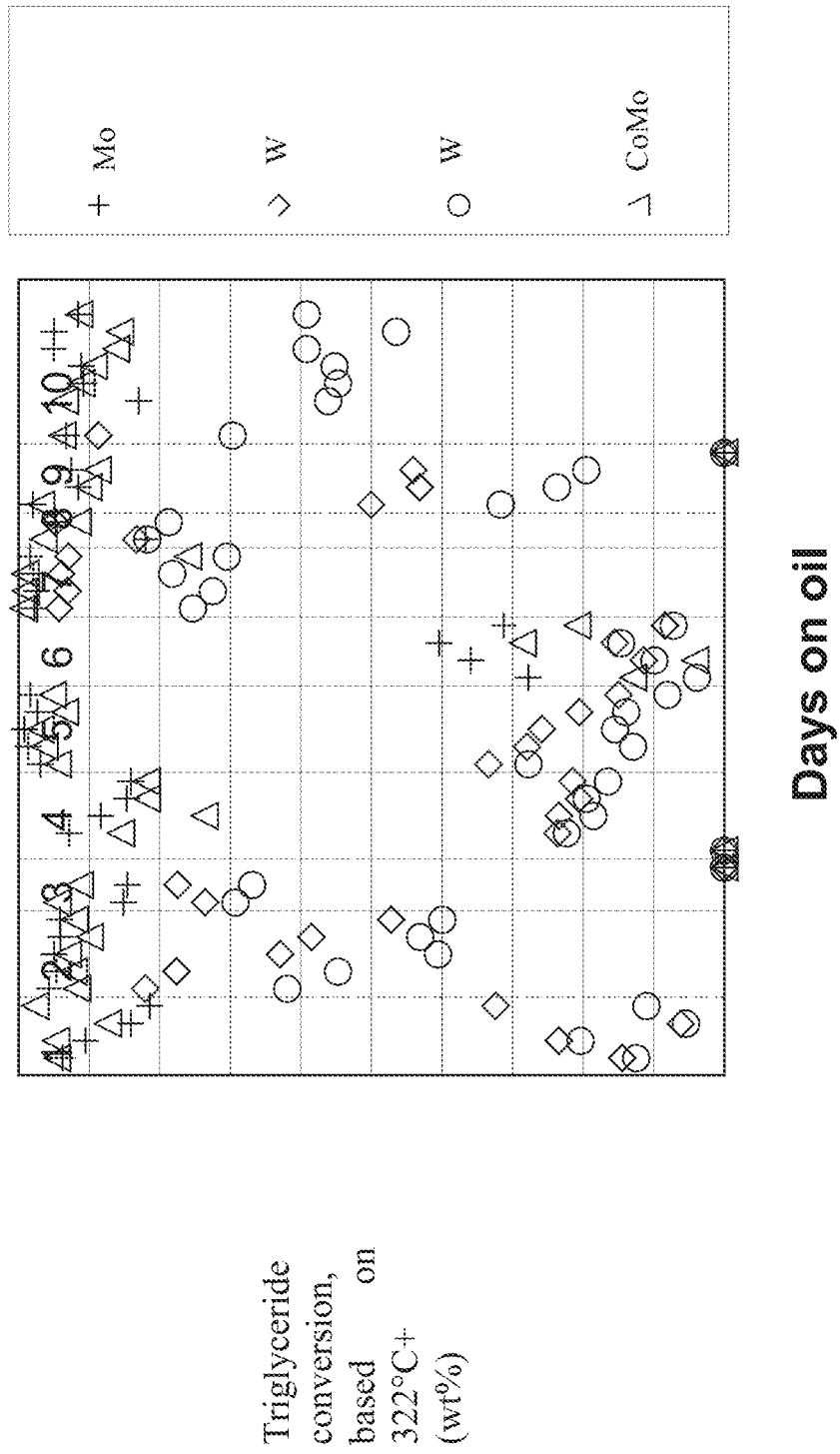

FIG. 11 shows the amount of conversion relative to 322° C. for the molybdenum, tungsten, and CoMo catalysts. At both 400 psig (2.76 MPag) and 1800 psig (12.4 MPag), the molybdenum catalyst produced deoxygenation levels of at least 98% while the CoMo catalyst resulted in at least 99% deoxygenation. The tungsten catalysts produced lower amounts of deoxygenation under test condition 2 of either about 30% deoxygenation (1.0 cm$^3$) or about 50% deoxygenation (1.5 cm$^3$). This indicates the lower space velocities (more catalyst per liquid feed volume) may be needed for the tungsten catalyst as compared to the molybdenum catalyst to achieve similar levels of deoxygenation of a feed.

In addition to characterizing the oxygen conversion, the amount of CO, $CO_2$, and $H_2O$ generated by each catalyst was also characterized. For CO and $CO_2$, the amount of carbon oxide generated can be characterized relative to the maximum possible yield based on the biocomponent source. For the soybean oil feed used as the biocomponent source, if all of the oxygen is removed by decarbonylation, the yield of CO would be 9.6 wt % relative to the weight of the soybean oil. If all of the oxygen is removed by decarboxylation, the yield of $CO_2$ would be 15.1 wt %.

Figure 5:
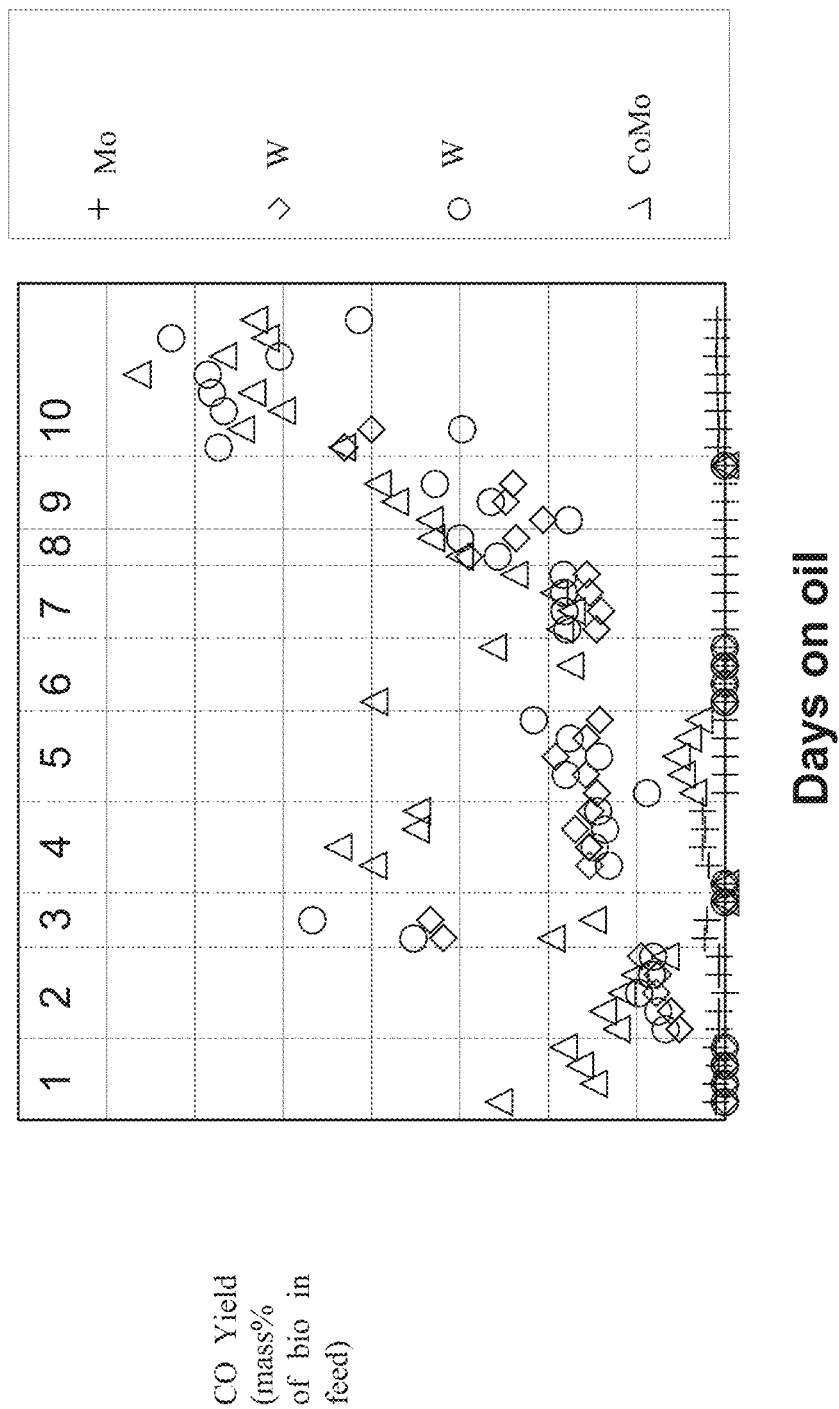
FIGS. 5 to 12 show analysis plots of the products formed from deoxygenation of a feedstock according to an embodiment of the invention associated testing is further described in the Examples herein.

FIG. 5 shows the CO yield for each of the catalysts tested at each of the ten conditions. As shown in FIG. 5, the catalyst containing Mo had the lowest production of CO, as almost no CO was detected in the output effluent from the reactor. The tungsten catalyst and CoMo catalyst produced somewhat higher amounts of CO.

Figure 6:
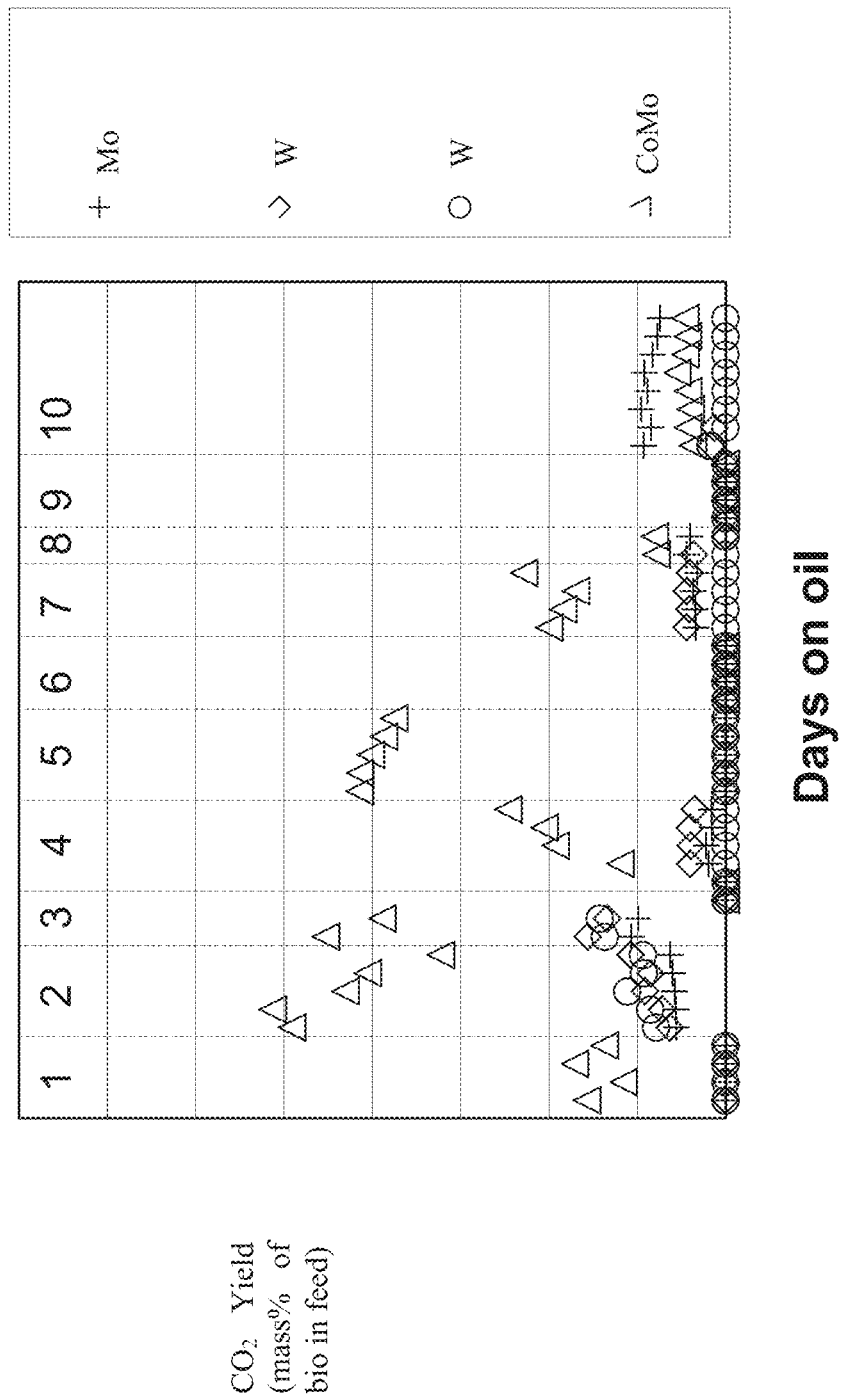

FIG. 6 shows the $CO_2$ for each of the catalysts under the ten conditions. As shown in FIG. 6, none of the conditions resulted in substantial amounts of $CO_2$. Part of the reason for this could be due to conversion of $CO_2$ into CO via a water gas shift reaction.

Figure 7:
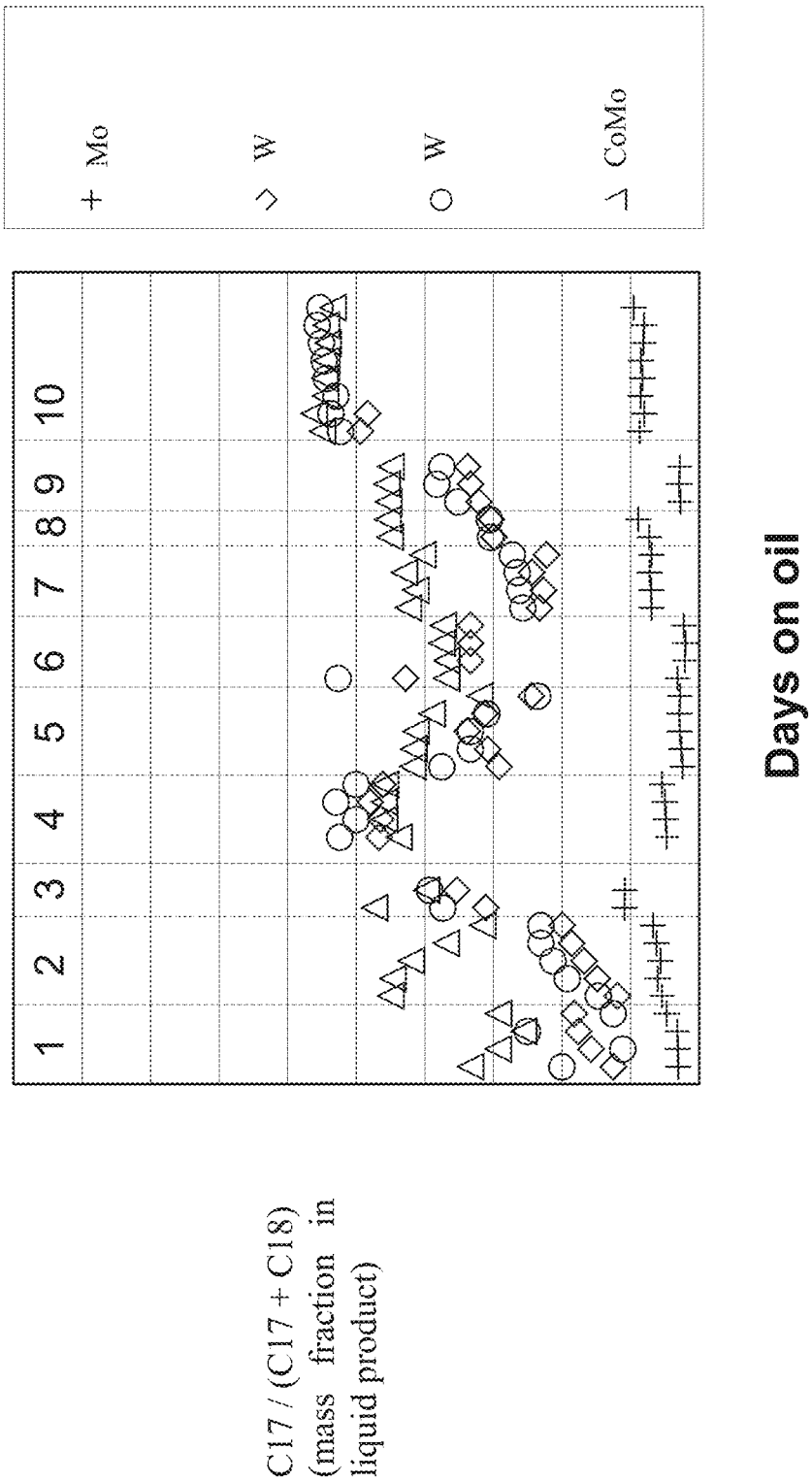

FIG. 7 shows the selectivity of the catalysts at each condition for removing oxygen via hydrodeoxygenation versus decarbonylation and decarboxylation. In FIG. 7, the amount of $C_{17}$ versus $C_{17}+C_{18}$ molecules in the effluent was used as a measure of whether oxygen was removed with or without carbon removal. As shown in FIG. 7, the $MoS_2$ catalyst removed only about 10% of the oxygen atoms in the form of CO or $CO_2$. This suggests that the amount of CO generated using a $MoS_2$ catalyst might be low enough to avoid the need for specialized corrosion-resistant equipment when coprocessing biocomponent feeds. The tungsten sulfide catalyst and the CoMo catalyst showed a roughly even split between $C_{17}$ and $C_{18}$ compounds.

Figure 8:
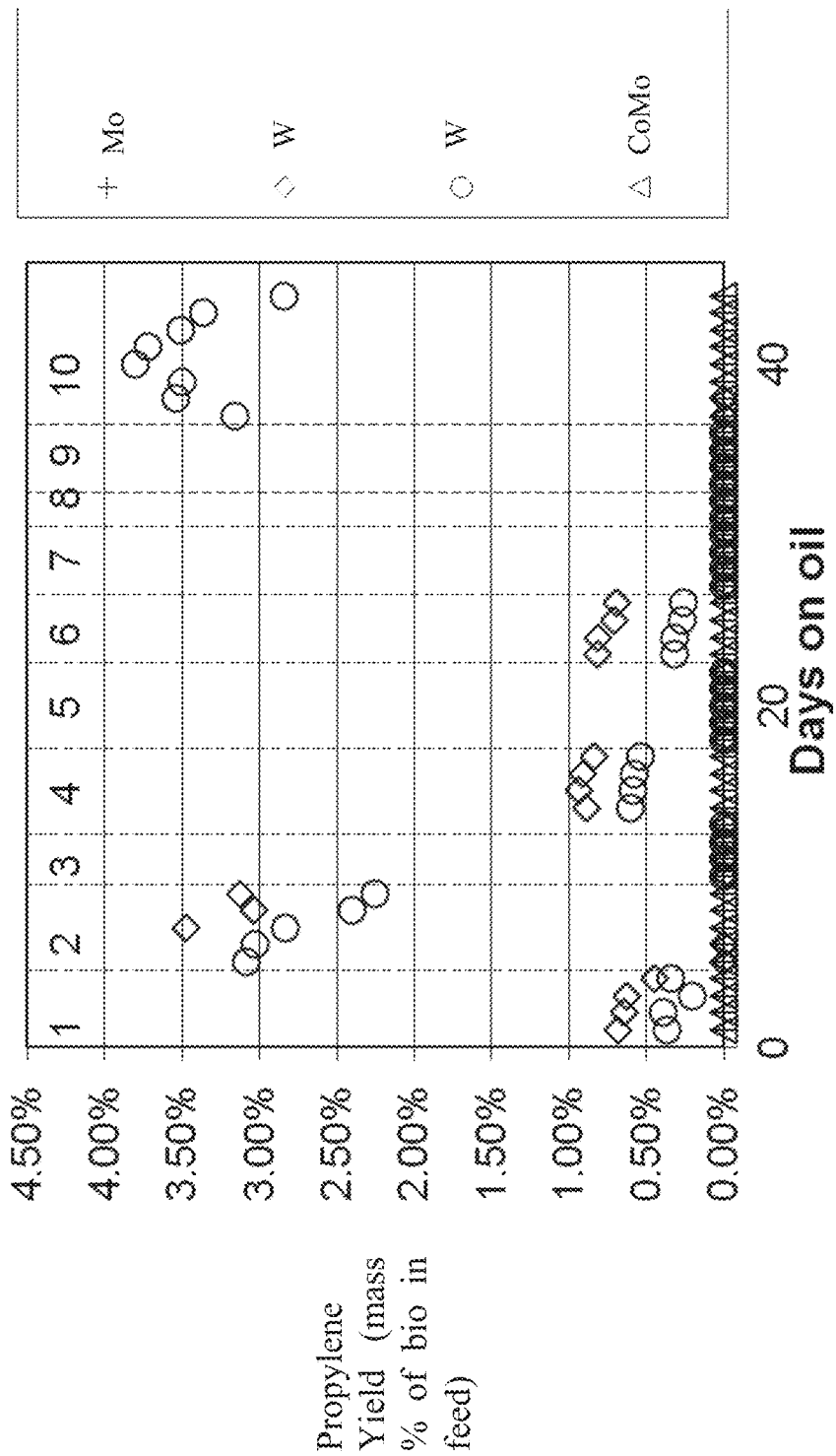

FIG. 8 shows the amount of propylene generated during deoxygenation using the various catalysts. The results shown unexpectedly high propylene production for the tungsten based catalysts under specific operating conditions (Examples of improved propylene generation during deoxygenation with a molybdenum catalyst will be discussed further in connection with FIG. 13.) As an initial note, the effluent from the deoxygenation experiments included both propane and propylene. Gas chromatography was used to detect individual gas phase components in the experiments. Unfortunately, due to the similar boiling points of propane and propylene, only one peak could be resolved for these two compounds in the gas chromatogram. As a result, for catalysts that generated more propane than propylene, the propylene amount could not be determined. It is likely that some amount of propylene was produced by the molybdenum catalyst, but that the amount was less than 50% of the total gas phase $C_3$ molecules generated. It is not expected that the CoMo catalyst generated propylene in any meaningful amount, due to the greater olefin saturation activity of the catalyst.

As shown in FIG. 8, the experiment with the higher catalyst loading (i.e., lower feed rate relative to catalyst volume) showed a greater level of propylene production during conditions 1-4. During condition 5, the experiment with the higher catalyst loading started to exhibit signs of becoming clogged. The clogging increased during the remaining conditions, resulting in little or no propylene production.

To further understand FIG. 8, the maximum theoretical yield of propylene from soybean oil based on forming propylene from the glycerol backbone is 4.8 wt %. This theoretical maximum corresponds to a feed composed of 100% soybean oil that is 100% deoxygenated. At conditions 2 and 10 in the experiments, a yield of about 3.0-3.5 wt % of propylene was measured. This corresponds to the highest yield observed at 400 psig (2.76 MPag). At 1800 psig (12.4 MPag), the highest observed yield was less than 1 wt % propylene. This is believed to indicate an increased tendency for olefin saturation at higher reaction pressures. However, even for the tungsten catalyst, the data is incomplete due to competition with propane formation. Other conditions may yield propylene at amounts greater than 1 wt %, but are not shown here due to representing less than 50% of the total $C_3$ molecules that were generated.

FIG. 8 also shows that the amount of propylene generated by deoxygenation using the tungsten catalyst varied based on the processing conditions. In particular, propylene was generated in an amount of greater than 2.0 wt % under certain conditions. As shown in FIG. 8, the processing conditions corresponding to conditions 2 and 10 resulted in generation of greater than 2.0 wt % propylene in general, and even greater than 3.5 wt % propylene in some specific configurations. The processing conditions included a temperature of 575° F. (302° C.), a pressure of 400 psig (2.76 MPag), and a soybean oil content of 30 wt %. As indicated by the results for condition 2, it is not believed that the space velocity of the feed is important for achieving the increased propylene yield. The propylene yields obtained at conditions 2 and 10 indicate that beneficial propylene yields can be obtained by processing a feedstock at a temperature from about 560° F. (293° C.) to about 600° F. (316° C.) and a pressure of about 300 psig (2.1 MPag) to about 500 psig (3.4 MPag). These conditions result in improved propylene yields for feeds containing from about 20 wt % to about 40 wt % of a triglyceride-containing feed portion.

Figure 9:
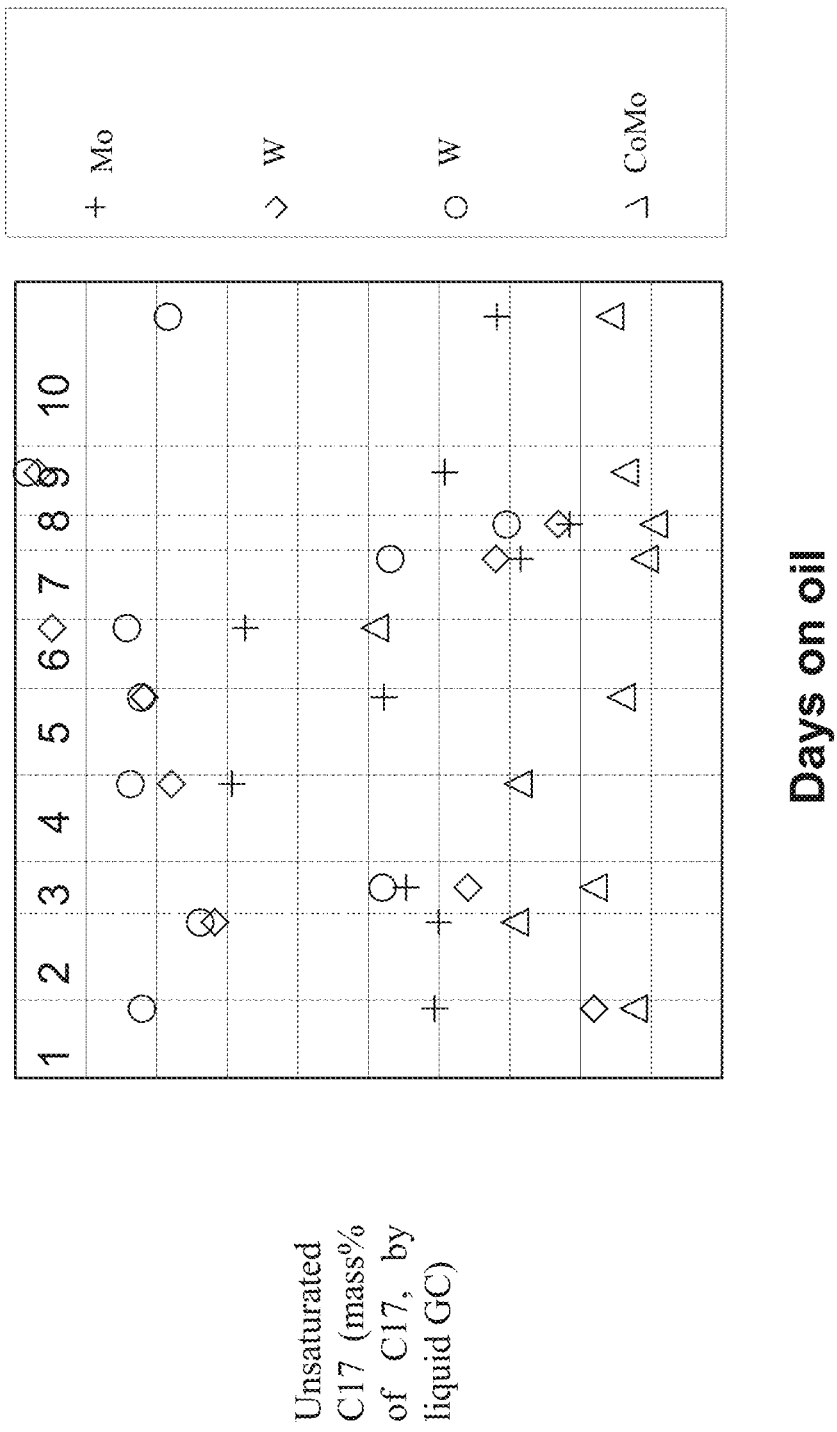
Figure 10:
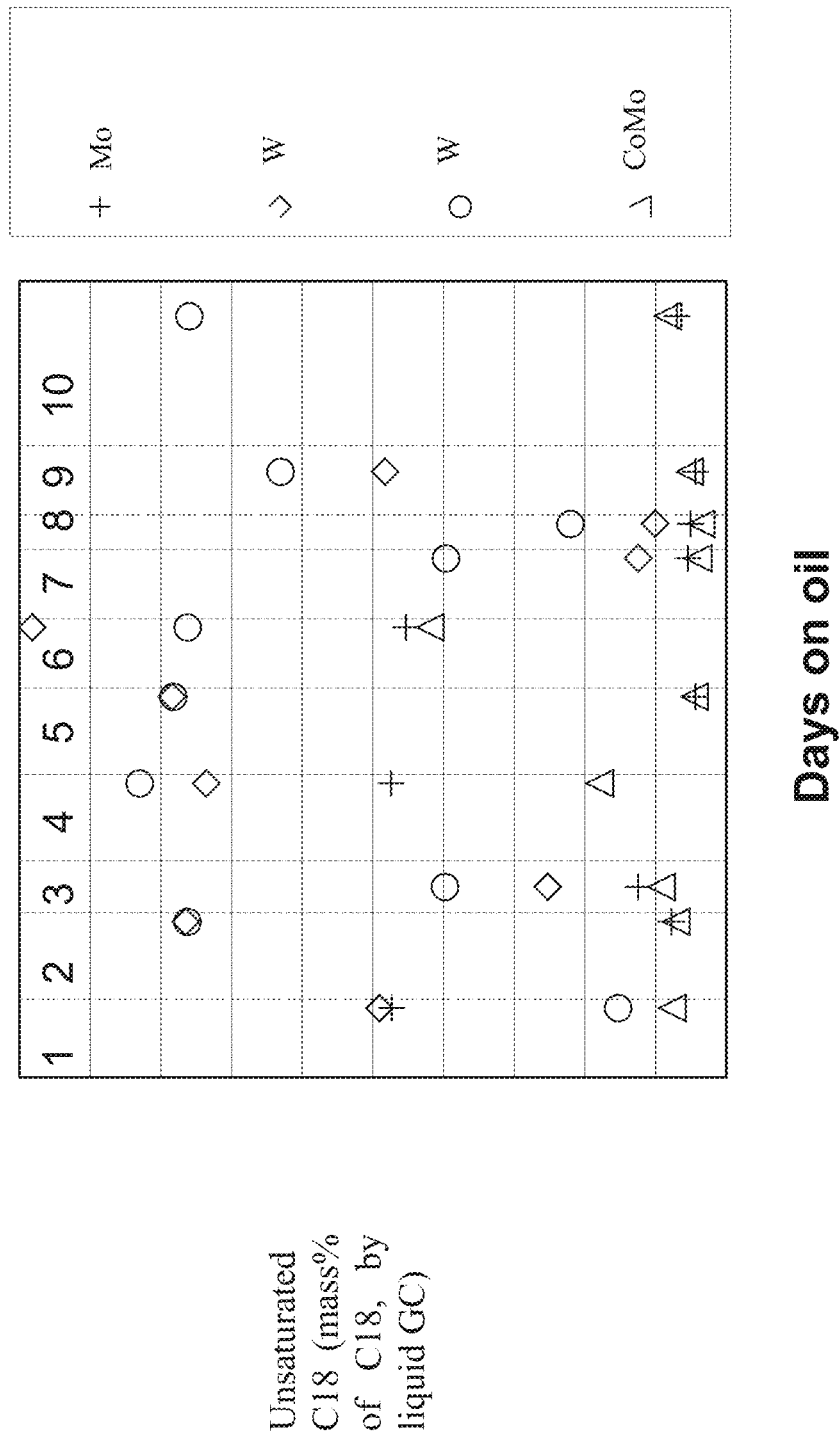

FIGS. 9 and 10 are related to the olefin content of the diesel boiling range molecules generated during deoxygenation. To determine the amount of olefin preservation, the amount of $C_{17}$ and $C_{18}$ olefins in the deoxygenated effluent were investigated relative to the total amount of the respective $C_{17}$ and $C_{18}$ molecules in the effluent. The $C_{17}$ olefins represent molecules formed by decarbonylation or decarboxylation, while the $C_{18}$ olefins represent molecules formed by hydrodeoxygenation.

FIG. 9 shows that deoxygenation using the molybdenum catalyst resulted in about 30-70% of the $C_{17}$ molecules containing at least one olefin. The amount of olefin preserved by the molybdenum catalyst does not appear to be strongly correlated with the reaction pressure. The $C_{17}$ olefin yield is similar but lower for the CoMo catalyst. For the tungsten catalyst, higher percentages of olefins were retained, with 80% or greater percentages of olefins observed at a number of conditions. For the deoxygenated product where 80% or more of the product molecules correspond to olefins, the resulting product has an olefin to paraffin ratio of greater than 0.09. Thus, deoxygenation using a tungsten catalyst provides a method for deoxygenation of a triglyceride (or other biocomponent) feed while preserving olefins initially present in the feed. It is noted, however, that the reaction conditions selected were not sufficient for full deoxygenation. Therefore, the additional severity required for complete deoxygenation using the tungsten catalyst may result in lower percentages of olefins.

FIG. 10 shows similar data for olefin preservation in $C_{18}$ molecules. This corresponds to olefins preserved in molecules formed by hydrodeoxygenation. In FIG. 10, the amount of olefins preserved by the various catalysts is comparable to the amount preserved for the $C_{17}$ molecules. This suggests that the mechanism for deoxygenation does not have a strong influence on whether an olefin is ultimately saturated or preserved under the reaction conditions.

Figure 12:
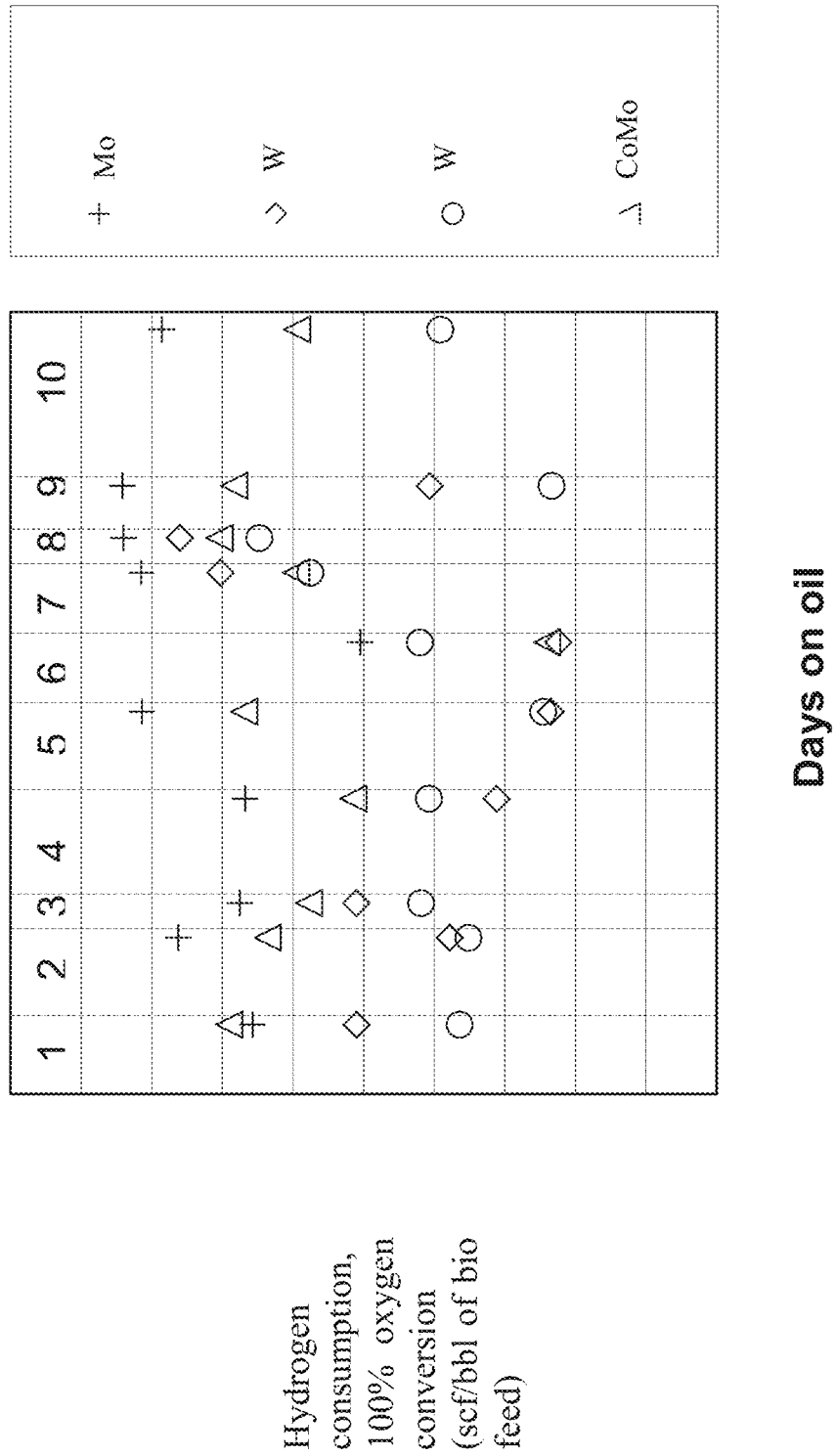

FIG. 12 shows hydrogen consumption for the various catalysts at full deoxygenation. The molybdenum catalyst shows a hydrogen consumption of 1500 scf/B or greater for all process conditions. This reflects the selectivity of the molybdenum catalyst for hydrodeoxygenation and for greater percentages of olefin saturation. By contrast, the hydrogen consumption for the tungsten catalyst varies with reaction condition. This reflects the variation in amount of olefin saturation for the tungsten catalyst depending on conditions, as well as changes in the relative amounts of hydrodeoxygenation and decarbonylation/decarboxylation depending on conditions.

In addition to the above experiments, an additional set of process runs was performed using metal sulfide catalysts physically promoted with MgO or ZnO. In these additional experiments, three types of catalyst were investigated. One catalyst included 3.0 wt % of ZnO and 10.6 wt % of $MoO_3$ on an alumina support. A second catalyst included 3.0 wt % of MgO and 21.4 wt % of $MoO_3$ on an alumina support. Samples of these catalysts were dried or calcined at 100° C. and 300° C. prior to sulfidation and use in the process runs. A third catalyst included ZnO and $MoO_3$ in a 1.5 to 1 ratio on an alumina support. The catalysts were used for deoxygenation of a triglyceride-containing feed that included about 50 wt % each of canola oil and dodecane. The reaction conditions included a hydrogen partial pressure of 400 psig (2.76 MPag), an LHSV of 1 $hr^{-1}$, and a hydrogen treat gas rate of about 2000 scf/bbl (337 $Nm^3/m^3$). The reaction temperature was 295° C. For each catalyst, the deoxygenation conditions were sufficient to remove at least 80% of the oxygen in the canola oil. The deoxygenation activity of the physically promoted catalysts was similar to or slightly greater than the activity for a corresponding molybdenum catalyst without a physical promoter. In these experiments, the production of propylene versus propane was characterized in a manner different from FIG. 8, so that lower relative amounts of propylene production could be detected.

Figure 13:
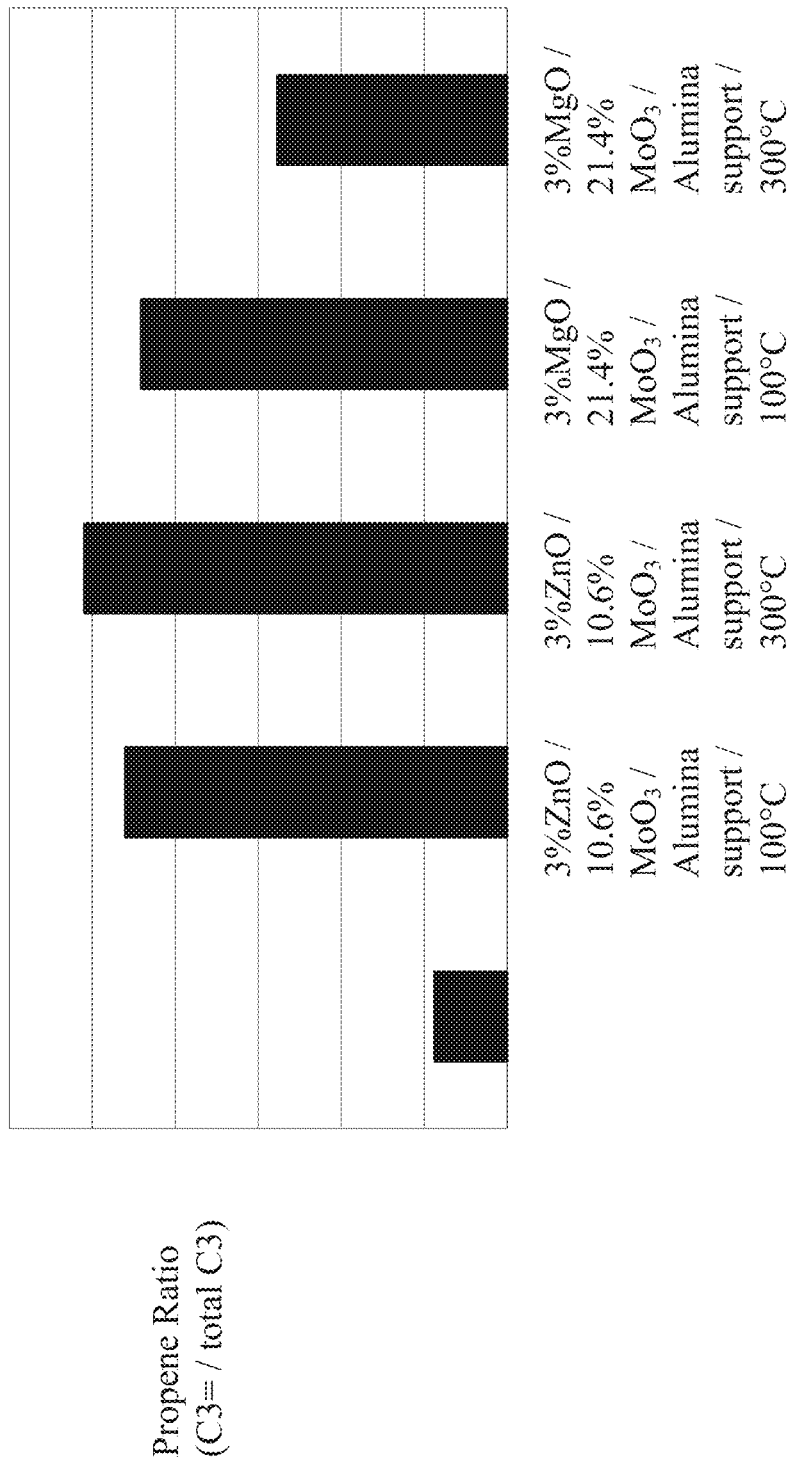
FIG. 13 shows a plot of relative propylene production from additional examples of deoxygenation of a feedstock according to an embodiment of the invention.

FIG. 13 shows the selectivity for propylene production for each of the catalysts at the indicated temperature. The vertical axis (entitled "Propene Ratio") indicates the amount of propylene ($C_3=$) generated relative to the combined propylene and propane (total $C_3$) generated during the deoxygenation reaction. As shown in FIG. 13, the physically promoted $MoO_3$ catalysts demonstrated from about 25% selectivity for propylene production, for the Mg promoted catalyst calcined at 300° C., to slightly greater than 50% selectivity for propylene production, for the Zn promoted catalyst calcined at 300° C. The selectivity in the propylene production from the catalyst including a majority of ZnO was noticeably lower. As shown in FIG. 13, inclusion of an amount of ZnO that is less than the amount of $MoO_3$ on a catalyst as a physical promoter resulted in a catalyst with the desired deoxygenation specific reactivity of a Group VI metal catalyst while providing an increased selectivity of propylene. It is noted that the catalyst including a larger amount of ZnO than $MoO_3$ resulted in a sharply reduced selectivity for propylene. This indicates that using ZnO as a physical promoter for $MoO_3$ provided the increased propylene benefit, as opposed to Zn being a desirable catalytic metal for deoxygenation.

ADDITIONAL EMBODIMENTS

Embodiment 1

A method for processing a biocomponent feedstock, comprising: exposing a feedstock comprising at least about 25 wt % triglycerides to a first catalyst in the presence of hydrogen under effective deoxygenation conditions for forming an at least partially deoxygenated effluent, the at least partially deoxygenated effluent having an oxygen content that is at least 40% less than an oxygen content of the feedstock, the catalyst comprising a supported Group VI metal catalyst or a supported Group VIII non-noble metal catalyst; separating the at least partially deoxygenated effluent to form a gas phase effluent and a liquid phase effluent, the liquid phase effluent comprising at least about 15 wt % olefins; and fractionating at least a portion of the liquid phase effluent to form a diesel product fraction, the diesel product fraction having an olefin to paraffin ratio of at least about 0.04.

Embodiment 2

The method of Embodiment 1, further comprising: exposing the liquid phase effluent, prior to fractionation, to an acidic catalyst under effective conditions for oligomerization of at least a portion of the olefins to form a product effluent, wherein fractionating the at least a portion of the liquid phase effluent comprises fractionating the product effluent to form at least a diesel product fraction and a lubricant base oil product fraction.

Embodiment 3

A method for processing a biocomponent feedstock, comprising: exposing a feedstock comprising at least about 25 wt % triglycerides to a first catalyst in the presence of hydrogen under effective deoxygenation conditions for forming an at least partially deoxygenated effluent, the at least partially deoxygenated effluent having an oxygen content that is at least 40% less than an oxygen content of the feedstock, the catalyst comprising a supported Group VI metal catalyst or a supported Group VIII non-noble metal catalyst; separating the at least partially deoxygenated effluent to form a gas phase effluent and a liquid phase effluent, the liquid phase effluent comprising at least about 15 wt % olefins; exposing the liquid phase effluent to an acidic catalyst under effective conditions for oligomerization of at least a portion of the olefins to form a product effluent; and fractionating at least a portion of the liquid phase effluent to form a diesel product fraction and a lubricant base oil product fraction, the diesel product fraction having an olefin to paraffin ratio of at least about 0.04.

Embodiment 4

The method of any of the above embodiments, wherein the liquid phase effluent has an olefin to paraffin ratio of at least about 0.06.

Embodiment 5

The method of any of the above embodiments, wherein the effective deoxygenation conditions include a temperature from about 250° C. to about 350° C., an LHSV from about 0.2 hr$^{-1}$ to about 10 hr$^{-1}$, and a hydrogen partial pressure of about 200 psig (1.4 MPag) to about 2000 psig (14 MPag).

Embodiment 6

The method of any of Embodiments 2-5, wherein the effective oligomerization conditions include a pressure from about 300 psig (2.1 MPag) to about 1000 psig (6.9 MPag), such as pressure provided by pressurizing with $N_2$ or another inert gas, and a space velocity from about 0.1 hr$^{-1}$ to about 10.0 hr$^{-1}$ LHSV.

Embodiment 7

The method of any of the above embodiments, wherein the first catalyst comprises tungsten, molybdenum, or cobalt.

Embodiment 8

The method of Embodiment 7, wherein the first catalyst comprises tungsten.

Embodiment 9

The method of Embodiment 7, wherein the first catalyst comprises molybdenum.

Embodiment 10

The method of Embodiment 7, wherein the first catalyst comprises cobalt.

Embodiment 11

The method of any of Embodiments 7 to 10, wherein the first catalyst further comprises a physical promoter metal.

Embodiment 12

The method of Embodiment 11, wherein the physical promoter metal is zinc, magnesium, or a combination thereof.

Embodiment 13

The method of Embodiment 11, wherein the catalyst comprises zinc and molybdenum.

Embodiment 14

The method of Embodiment 11, wherein the catalyst comprises zinc and tungsten.

Embodiment 15

The method of Embodiment 11, wherein the catalyst comprises magnesium and molybdenum.

Embodiment 16

The method of Embodiment 11, wherein the catalyst comprises magnesium and tungsten.

Embodiment 17

The method of any of Embodiments 1 to 8, 11, 12, 14, or 16, wherein the first catalyst comprises tungsten, the feedstock comprises from about 25 wt % to 40 wt % triglycerides, and the effective deoxygenation conditions include a temperature from about 560° F. (293° C.) to about 600° F. (316° C.), an LHSV from about 0.2 hr$^{-1}$ to about 10 hr$^{-1}$, and a hydrogen partial pressure of about 300 psig (2.1 MPag) to about 500 psig (3.4 MPag).

Embodiment 18

The method of any of Embodiments 1 to 7, 9, or 11-13, wherein the first catalyst comprises zinc and molybdenum, the feedstock comprises from about 25 wt % to about 40 wt % triglycerides, and the effective deoxygenation conditions include a temperature from about 560° F. (293° C.) to about 600° F. (316° C.), an LHSV from about 0.2 hr$^{-1}$ to about 10 hr$^{-1}$, and a hydrogen partial pressure of about 300 psig (2.1 MPag) to about 500 psig (3.4 MPag).

Embodiment 19

The method of any of Embodiments 2-18, wherein the acidic catalyst comprises MCM-49, MCM-56, zeolite USY, montmorillonite, an acidic clay, sulfated $ZrO_2$, tungsten oxide, or a combination thereof, the acidic catalyst optionally being a supported catalyst.

Embodiment 20

The method of any of Embodiments 2-18, wherein the acidic catalyst comprises MCM-49, MCM-56, or tungsten oxide supported on zirconia.

Embodiment 21

The method of any of Embodiments 2-20, further comprising: hydrotreating at least a portion of the product effluent under effective hydrotreating conditions; and exposing at least a portion of the hydrotreated product effluent to a dewaxing catalyst under effective dewaxing conditions.

Embodiment 22

The method of any of the above embodiments, wherein the feedstock comprises at least 40 wt % of triglycerides.

Embodiment 23

The method of any of the above embodiments, wherein the deoxygenated effluent comprises at least about 40 wt % of olefins.

Embodiment 24

The method of any of the above embodiments, wherein the feedstock comprises from about 10 wt % to about 70 wt % of a recycle feed, the recycle feed corresponding to a recycled portion of at least one of the liquid phase effluent or the diesel product fraction.

Embodiment 25

A method for processing a biocomponent feedstock, comprising: exposing a feedstock containing triglycerides to a physically promoted Group VI metal catalyst comprising tungsten in the presence of hydrogen under effective deoxygenation conditions for forming an at least partially deoxygenated effluent, the at least partially deoxygenated effluent having an oxygen content that is at least 40% less than an oxygen content of the feedstock; exposing the liquid phase effluent to an acidic catalyst comprising MCM-49, MCM-56, or tungsten oxide supported on zirconia under effective conditions for oligomerization of at least a portion of the olefins to form a product effluent; and fractionating at least a portion of the liquid phase effluent to form a diesel product fraction and a lubricant base oil product fraction, the diesel product fraction having an olefin to paraffin ratio of at least about 0.04.

Embodiment 26

A method for processing a biocomponent feedstock, comprising: exposing a feedstock containing triglycerides to a physically promoted Group VI metal catalyst comprising zinc and molybdenum in the presence of hydrogen under effective deoxygenation conditions for forming an at least partially deoxygenated effluent, the at least partially deoxygenated effluent having an oxygen content that is at least 40% less than an oxygen content of the feedstock; exposing the liquid phase effluent to an acidic catalyst comprising MCM-49, MCM-56, or tungsten oxide supported on zirconia under effective conditions for oligomerization of at least a portion of the olefins to form a product effluent; and fractionating at least a portion of the liquid phase effluent to form a diesel product fraction and a lubricant base oil product fraction, the diesel product fraction having an olefin to paraffin ratio of at least about 0.04.

Embodiment 27

The method of any of Embodiments 25 or 26, wherein the effective deoxygenation conditions include a temperature from about 250° C. to about 350° C., an LHSV from about 0.2 $hr^{-1}$ to about 10 $hr^{-1}$, and a hydrogen partial pressure of about 200 psig (1.4 MPag) to about 2000 psig (14 MPag).

Embodiment 28

The method of any of Embodiments 25 or 26, wherein the feedstock comprises from about 15 wt % to about 40 wt % triglycerides, preferably 25 wt % to 35 wt % triglycerides, and the effective deoxygenation conditions include a temperature from about 560° F. (293° C.) to about 600° F. (316° C.), an LHSV from about 0.2 $hr^{-1}$ to about 10 $hr^{-1}$, and a hydrogen partial pressure of about 300 psig (2.1 MPag) to about 500 psig (3.4 MPag).

Embodiment 29

The method of any of Embodiments 25 to 28, wherein the effective oligomerization conditions include a pressure from about 300 psig (2.1 MPag) to about 1000 psig (6.9 MPag), such as pressure provided by pressurizing with $N_2$ or another inert gas, and a space velocity from about 0.1 $hr^{-1}$ to about 10.0 $hr^{-1}$ LHSV.

Embodiment 30

A diesel fuel product produced according to the method of any of the above embodiments.

Embodiment 31

The diesel fuel product of Embodiment 30, the diesel fuel product having a cetane rating of at least 40 comprising at least about 50 wt % of molecules containing from 12 carbons to 18 carbons, an olefin to paraffin ratio of at least about 0.06, an oxygen content of about 1.0 wt % or less, a sulfur content of 50 wppm or less, and a T95 boiling point of 370° C. or less.

Embodiment 32

The diesel fuel product of Embodiments 30 or 31, wherein the olefin to paraffin ratio is at least about 0.075.

Embodiment 33

The diesel fuel product of any of Embodiments 30-32, wherein the oxygen content is about 0.5 wt % or less.

Embodiment 34

The diesel fuel product of any of Embodiments 30-33, wherein the diesel fuel product comprises at least about 40 wt % olefins.

What is claimed is:

1. A method for processing a biocomponent feedstock, comprising:

exposing a feedstock comprising at least about 25 wt % triglycerides to a first catalyst in the presence of hydrogen under effective deoxygenation conditions for forming an at least partially deoxygenated effluent, the at least partially deoxygenated effluent having at least about 40 wt % of olefins and having an oxygen content that is at least 40% less than an oxygen content of the feedstock, the first catalyst comprising a supported Group VI metal catalyst or a supported Group VIII non-noble metal catalyst;

separating the at least partially deoxygenated effluent to form a gas phase effluent and a liquid phase effluent, the liquid phase effluent comprising at least 15 wt % olefins;

exposing the liquid phase effluent to an acidic catalyst under effective conditions for oligomerization of at least a portion of the olefins to form a product effluent; and fractioning at least a portion of the product effluent to form a diesel product fraction, the diesel product fraction having an olefin to paraffin ratio of at least about 0.04.

2. A method for processing a biocomponent feedstock, comprising:

exposing a feedstock comprising at least about 25 wt % triglycerides to a first catalyst in the presence of hydrogen under effective deoxygenation conditions for forming an at least partially deoxygenated effluent, the at least partially deoxygenated effluent having at least about 40 wt % of olefins and having an oxygen content that is at least 40% less than an oxygen content of the feedstock, the first catalyst comprising a supported Group VI metal catalyst or a supported Group VIII non-noble metal catalyst;

separating the at least partially deoxygenated effluent to form a gas phase effluent and a liquid phase effluent, the liquid phase effluent comprising at least 15 wt % olefins;

exposing the liquid phase effluent to an acidic catalyst under effective conditions for oligomerization of at least a portion of the olefins to form a product effluent; and fractioning at least a portion of the liquid phase effluent to form a diesel product fraction, the diesel product fraction having an olefin to paraffin ratio of at least about 0.04.

3. The method of claim 1 or 2, wherein the feedstock comprises at least 40 wt % of triglycerides.

4. The method of claim 1 or 2, wherein the liquid phase effluent has an olefin to paraffin ratio of at least about 0.06.

5. The method of claim 1 or 2, wherein the effective deoxygenation conditions include a temperature from about 250° C. to about 350° C., an LHSV from about 0.2 hr$^{-1}$ to about 10 hr$^{-1}$, and a hydrogen partial pressure of about 200 psig (1.4 MPag) to about 2000 psig (14 MPag).

6. The method of claim 1 or 2, wherein the acidic catalyst comprises MCM-49, MCM-56, zeolite USY, montmorillonite, an acidic clay, sulfated $ZrO_2$, tungsten, or a combination thereof, the acidic catalyst optionally being a supported catalyst.

7. The method of claim 1 or 2, further comprising:

hydrotreating at least a portion of the product effluent under effective hydrotreating conditions to produce a hydrotreated product effluent; and exposing at least a portion of the hydrotreated product effluent to a dewaxing catalyst under effective dewaxing conditions.

8. The method of claim 1 or 2, wherein the first catalyst comprises tungsten, molybdenum or cobalt.

9. The method of claim 1 or 2 wherein the first catalyst consists essentially of a Group VI metal catalyst or a Group VIII non-noble metal catalyst.

10. The method of claim 1 or 2, wherein the first catalyst consist essentially of a Group VI metal catalyst with a physical promoter metal or a Group VIII non-noble metal catalyst with a physical promoter metal.

11. The method of claim 1 or 2, wherein the first catalyst comprises zinc and molybdenum, zinc and tungsten, magnesium and molybdenum, or magnesium and tungsten.

12. The method of claim 1 or 2, wherein the feedstock comprises from about 10 wt % to about 50 wt % of a recycle feed, the recycle feed corresponding to a recycled portion of at least one of the liquid phase effluent or the diesel product fraction.

13. The method of claim 1 or 2, wherein the at least partially deoxygenated effluent has an oxygen content of about 1.0 wt % or less.

* * * * *